US012028823B2

(12) United States Patent
Abedini et al.

(10) Patent No.: US 12,028,823 B2
(45) Date of Patent: Jul. 2, 2024

(54) TIMING ADJUSTMENT FOR WIRELESS REMOTE UNITS

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 17/449,977

(22) Filed: Oct. 5, 2021

(65) Prior Publication Data
US 2022/0110077 A1 Apr. 7, 2022

Related U.S. Application Data

(60) Provisional application No. 63/198,267, filed on Oct. 7, 2020.

(51) Int. Cl.
*H04W 56/00* (2009.01)
*H04L 5/00* (2006.01)

(52) U.S. Cl.
CPC ....... *H04W 56/0045* (2013.01); *H04L 5/0048* (2013.01)

(58) Field of Classification Search
CPC ......... H04W 56/0045; H04W 74/0833; H04W 48/16; H04W 36/0058; H04L 5/0048; H04L 27/2601; G06N 3/09; H04B 7/18502; H04B 7/0695
See application file for complete search history.

(56) References Cited

U.S. PATENT DOCUMENTS

| 10,312,984 | B2 * | 6/2019 | Yazdani | ............. H04B 7/18502 |
| 11,569,891 | B2 * | 1/2023 | Hashemi | ............. H04B 7/0695 |
| 2008/0304555 | A1 * | 12/2008 | Larsson | ............. H04L 27/2601 |
| | | | | 375/211 |

(Continued)

FOREIGN PATENT DOCUMENTS

| JP | 2023535878 A | * 10/2018 |
| JP | 2023535878 A | * 8/2023 |

(Continued)

OTHER PUBLICATIONS

Tekin, "On Secure Signaling for the Gaussian Multiple Access Wire-Tap Channel", IEEE, pp. 1747-1751, Oct. 2005 (Year: 2005).*

(Continued)

*Primary Examiner* — Ayaz R Sheikh
*Assistant Examiner* — Louis Samara
(74) *Attorney, Agent, or Firm* — Harrity & Harrity, LLP

(57) ABSTRACT

Various aspects of the present disclosure generally relate to wireless communication. In some aspects, a wireless forwarding node may determine a first timing reference configuration for communicating with a first wireless node. The wireless forwarding node may determine a second timing reference configuration for communicating with a second wireless node. The wireless forwarding node may forward communications between the first wireless node and the second wireless node based at least in part on the first timing reference configuration and the second timing reference configuration. Numerous other aspects are provided.

26 Claims, 17 Drawing Sheets

(56) References Cited

U.S. PATENT DOCUMENTS

| | | | |
|---|---|---|---|
| 2011/0007710 A1* | 1/2011 | Makita | H04W 36/0058 370/331 |
| 2011/0243121 A1* | 10/2011 | Chin | H04W 56/0045 370/350 |
| 2013/0252659 A1* | 9/2013 | Jia | H04W 48/16 455/522 |
| 2017/0085307 A1* | 3/2017 | Yazdani | H04B 7/18502 |
| 2019/0394738 A1* | 12/2019 | Abedini | H04W 74/0833 |
| 2020/0128539 A1* | 4/2020 | Abedini | H04W 72/23 |
| 2022/0014398 A1* | 1/2022 | Andrews | G06N 3/09 |
| 2023/0300767 A1* | 9/2023 | Jiang | H04W 74/0833 370/329 |

FOREIGN PATENT DOCUMENTS

| | | |
|---|---|---|
| WO | WO-2019074986 A1 | 4/2019 |
| WO | WO-2019245972 A1 | 12/2019 |
| WO | WO-2020167177 A1 | 8/2020 |

OTHER PUBLICATIONS

Tekin, Ender, "The Gaussian Multiple Access Wire-Tap Channel", IEEE, Feb. 9, 2007 (Year: 2007).*
International Search Report and Written Opinion—PCT/US2021/071735—ISA/EPO—dated Feb. 10, 2022.

* cited by examiner

TIMING ADJUSTMENT FOR WIRELESS REMOTE UNITS

CROSS-REFERENCE TO RELATED APPLICATION

This Patent Application claims priority to U.S. Provisional Patent Application No. 63/198,267, filed on Oct. 7, 2020, entitled "TIMING ADJUSTMENT FOR WIRELESS REMOTE UNITS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for timing adjustment for wireless remote units.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless forwarding node includes determining a first timing reference configuration for communicating with a first wireless node; determining a second timing reference configuration for communicating with a second wireless node; and forwarding communications between the first wireless node and the second wireless node based at least in part on the first timing reference configuration and the second timing reference configuration.

In some aspects, a method of wireless communication performed by a control node includes determining an adjustment to one or more timing reference configurations associated with a wireless forwarding node configured to forward communications between a first wireless node and a second wireless node; and transmitting, to the wireless forwarding node, one or more timing adjustment commands that indicate the adjustment to the one or more timing reference configurations.

In some aspects, a method of wireless communication performed by a transmitter node includes transmitting, to a wireless forwarding node, a signal to be forwarded to a wireless receiver node, wherein the wireless forwarding node is associated with a receive timing for receiving the signal from the transmitter node; determining an estimated timing offset to be applied to the receive timing associated with the wireless forwarding node based at least in part on the wireless forwarding node forwarding the signal back to the transmitter node; and transmitting, to the wireless forwarding node, a timing adjustment command that indicates the estimated timing offset to be applied to the receive timing.

In some aspects, a wireless forwarding node for wireless communication includes a memory; and one or more processors, coupled to the memory, configured to: determine a first timing reference configuration for communicating with a first wireless node; determine a second timing reference configuration for communicating with a second wireless node; and forward communications between the first wireless node and the second wireless node based at least in part on the first timing reference configuration and the second timing reference configuration.

In some aspects, a control node for wireless communication includes a memory; and one or more processors, coupled to the memory, configured to: determine an adjustment to one or more timing reference configurations associated with a wireless forwarding node configured to forward communications between a first wireless node and a second wireless node; and transmit, to the wireless forwarding node, one or more timing adjustment commands that indicate the adjustment to the one or more timing reference configurations.

In some aspects, a transmitter node for wireless communication includes a memory; and one or more processors, coupled to the memory, configured to: transmit, to a wireless forwarding node, a signal to be forwarded to a wireless receiver node, wherein the wireless forwarding node is associated with a receive timing for receiving the signal from the transmitter node; determine an estimated timing offset to be applied to the receive timing associated with the wireless forwarding node based at least in part on the wireless forwarding node forwarding the signal back to the transmitter node; and transmit, to the wireless forwarding node, a timing adjustment command that indicates the estimated timing offset to be applied to the receive timing.

In some aspects, a non-transitory computer-readable medium stores one or more instructions for wireless communication that, when executed by one or more processors of a wireless forwarding node, cause the wireless forwarding node to: determine a first timing reference configuration for communicating with a first wireless node; determine a second timing reference configuration for communicating with a second wireless node; and forward communications between the first wireless node and the second wireless node based at least in part on the first timing reference configuration and the second timing reference configuration.

In some aspects, a non-transitory computer-readable medium stores one or more instructions for wireless communication that, when executed by one or more processors of a control node, cause the control node to: determine an adjustment to one or more timing reference configurations associated with a wireless forwarding node configured to forward communications between a first wireless node and a second wireless node; and transmit, to the wireless forwarding node, one or more timing adjustment commands that indicate the adjustment to the one or more timing reference configurations.

In some aspects, a non-transitory computer-readable medium stores one or more instructions for wireless communication that, when executed by one or more processors of a transmitter node, cause the transmitter node to: transmit, to a wireless forwarding node, a signal to be forwarded to a wireless receiver node, wherein the wireless forwarding node is associated with a receive timing for receiving the signal from the transmitter node; determine an estimated timing offset to be applied to the receive timing associated with the wireless forwarding node based at least in part on the wireless forwarding node forwarding the signal back to the transmitter node; and transmit, to the wireless forwarding node, a timing adjustment command that indicates the estimated timing offset to be applied to the receive timing.

In some aspects, an apparatus for wireless communication includes means for determining a first timing reference configuration for communicating with a first wireless node; means for determining a second timing reference configuration for communicating with a second wireless node; and means for forwarding communications between the first wireless node and the second wireless node based at least in part on the first timing reference configuration and the second timing reference configuration.

In some aspects, an apparatus for wireless communication includes means for determining an adjustment to one or more timing reference configurations associated with a wireless forwarding node configured to forward communications between a first wireless node and a second wireless node; and means for transmitting, to the wireless forwarding node, one or more timing adjustment commands that indicate the adjustment to the one or more timing reference configurations.

In some aspects, an apparatus for wireless communication includes means for transmitting, to a wireless forwarding node, a signal to be forwarded to a wireless receiver node, wherein the wireless forwarding node is associated with a receive timing for receiving the signal from the apparatus; means for determining an estimated timing offset to be applied to the receive timing associated with the wireless forwarding node based at least in part on the wireless forwarding node forwarding the signal back to the apparatus; and means for transmitting, to the wireless forwarding node, a timing adjustment command that indicates the estimated timing offset to be applied to the receive timing.

Aspects generally include a method, apparatus, system, computer program product, non-transitory computer-readable medium, user equipment, base station, distributed unit, mobile termination unit, forwarding node, repeater node, relay node, control node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
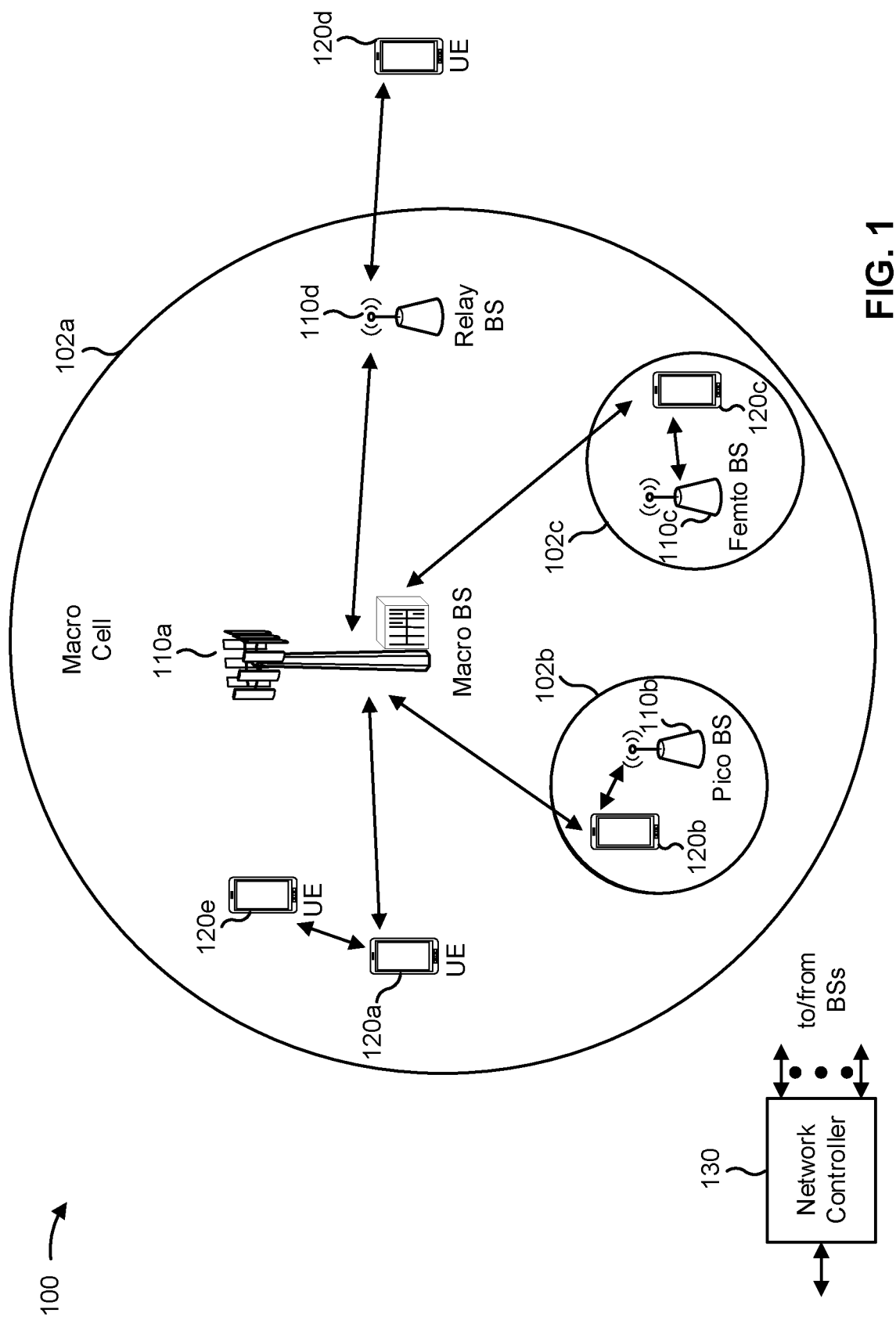
FIG. 1 is a diagram illustrating an example of a wireless network, in accordance with the present disclosure.

In some communication systems, such as 5G or NR, a multi-hop network such as an integrated access and backhaul (IAB) network may be deployed to enable communication between wireless nodes of the network. In general, the wireless nodes that are deployed in the multi-hop network may be associated with a timing scheme or timing configuration that enables alignment of communications between wireless nodes associated with different links. For example, one or more timing references may be used to identify a set of communication opportunities, such as a set of symbols or a set of slots that are allocated for a set of channels. For example, in an IAB network, the timing references may include a downlink transmit timing that an upstream node (e.g., a distributed unit (DU) of an IAB donor and/or a DU of an IAB node) uses to transmit one or more downlink signals to a downstream node (e.g., a UE and/or a mobile termination (MT) unit of a child IAB node). Furthermore, the timing references may include a downlink receive timing that the downstream node uses to receive the downlink signals from the upstream node, an uplink transmit timing that the downstream node uses to transmit uplink signals to the upstream node, and/or an uplink receive timing that the upstream node uses to receive the uplink signals from the downstream node. The downlink transmit timing may generally be aligned across all upstream nodes, and a threshold time misalignment may be tolerated for the uplink transmit timing to account for different propagation delays and/or round-trip times between upstream and downstream nodes.

Some aspects described herein enable a timing framework to adjust various timing references for a wireless forwarding node deployed in a multi-hop network (e.g., to extend coverage of a base station and/or enable communication between two nodes that may otherwise be outside of wireless communication range). For example, in some aspects, the wireless forwarding node may be configured to communicate with a first wireless node using a first timing reference configuration and with a second wireless node using a second timing reference configuration. For example, the first timing reference configuration may include timing references associated with transmitting signals to and receiving signals from the first wireless node, and the second timing reference configuration may include timing references associated with transmitting signals to and receiving signals from the second wireless node. In some aspects, the wireless forwarding node may establish transmit and receive timing references (e.g., symbol-level alignments) for the first timing reference configuration and the second timing reference configuration, and may adjust or fine-tune the transmit and receive timing references (e.g., at a sub-symbol-level and/or a sample-level) autonomously and/or based on one or more timing adjustment commands provided by a control node (e.g., based on timing estimation feedback provided to the control node). In this way, the adjustment of the timing references may increase synchronization among different nodes in the multi-hop network, which may improve accuracy of positioning determinations, increase a number of hops supported in the multi-hop network, reduce interference in the multi-hop network, and/or reduce distortion associated with forwarded signals, among other examples.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
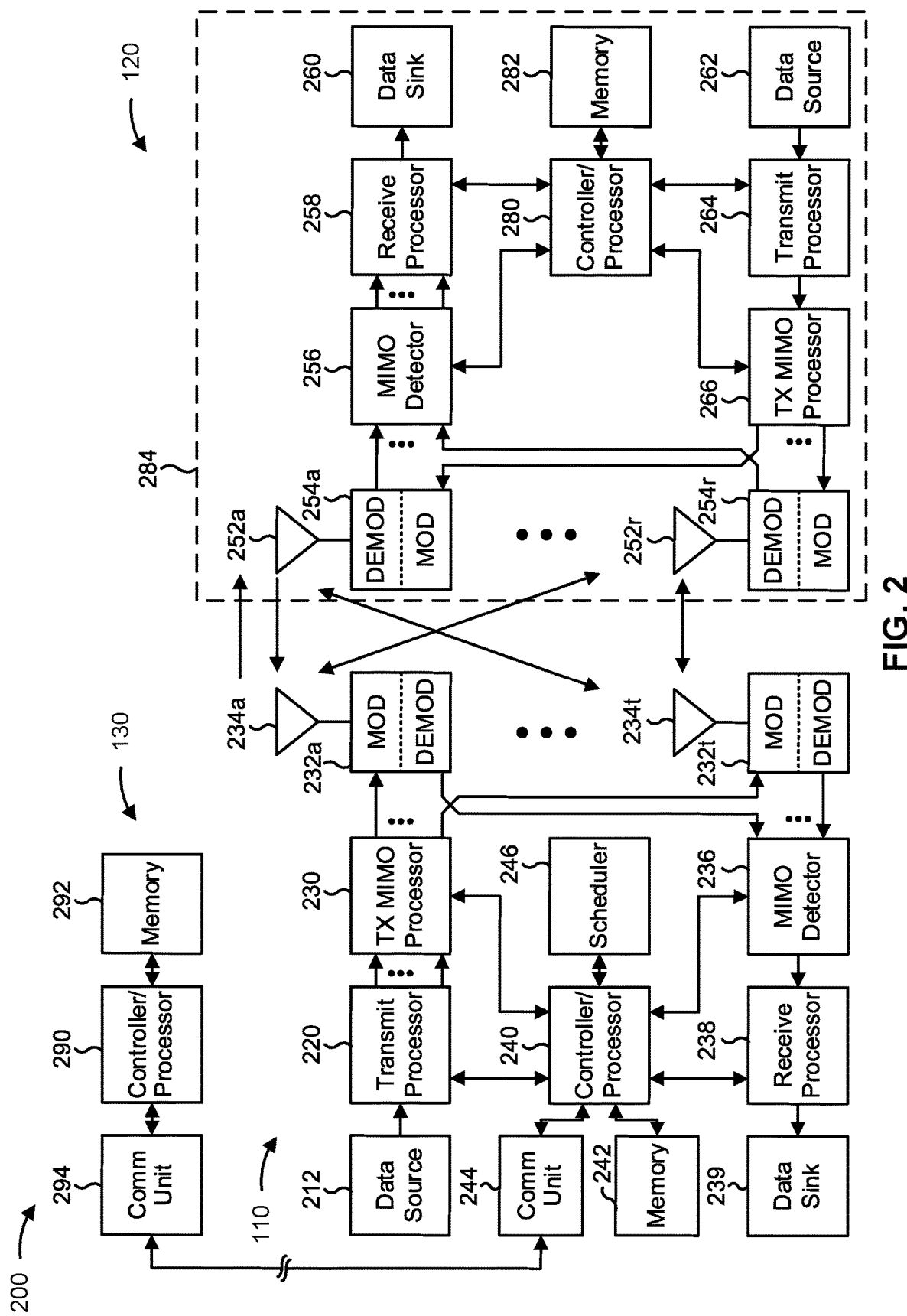
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234$a$ through 234$t$, and UE 120 may be equipped with R antennas 252$a$ through 252$r$, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232$a$ through 232$t$. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232$a$ through 232$t$ may be transmitted via T antennas 234$a$ through 234$t$, respectively.

At UE 120, antennas 252$a$ through 252$r$ may receive the downlink signals from base station 110 and/or other base stations and may provide received signals to demodulators (DEMODs) 254$a$ through 254$r$, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254$a$ through 254$r$, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234$a$ through 234$t$ and/or antennas 252$a$ through 252$r$) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254$a$ through 254$r$ (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 8-16).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 8-16).

Controller/processor 240 of base station 110, controller/processor 280 of UE 120, and/or any other component(s) of FIG. 2 may perform one or more techniques associated with timing adjustment for wireless remote units, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, the wireless forwarding node includes means for determining a first timing reference configuration for communicating with a first wireless node, means for determining a second timing reference configuration for communicating with a second wireless node, and/or means for forwarding communications between the first wireless node and the second wireless node based at least in part on the first timing reference configuration and the second timing reference configuration. The means for the wireless forwarding node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. Additionally, or alternatively, the means for the wireless forwarding node to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the wireless forwarding node includes means for determining a receive timing for receiving one or more signals from the first wireless node based at least in part on one or more reference signal transmissions received from the first wireless node, and/or means for determining a transmit timing for forwarding one or more signals to the first wireless node based at least in part on one or more timing advance commands received from a control node or the first wireless node.

In some aspects, the wireless forwarding node includes means for receiving a signal from the first wireless node, means for forwarding the signal back to the first wireless node, and/or means for receiving, from the first wireless node or a control node, a timing adjustment command for the receive timing that indicates an estimated timing offset based at least in part on the signal forwarded back to the first wireless node.

In some aspects, the wireless forwarding node includes means for transmitting, to a control node or the first wireless node, information indicating an estimated timing offset associated with the receive timing.

In some aspects, the wireless forwarding node includes means for receiving, from a control node or the first wireless node, information indicating an adjustment to the receive timing associated with the wireless forwarding node.

In some aspects, the wireless forwarding node includes means for receiving, from the first wireless node, a signal to be forwarded to the second wireless node, wherein the signal is associated with a power delay profile including multiple channel taps received at different times, and/or means for forwarding the signal to the second wireless node using a cyclic prefix aligned with an earliest of the multiple channel taps that satisfies a threshold.

In some aspects, the wireless forwarding node includes means for receiving, from the second wireless node, a signal to be forwarded to the first wireless node, wherein the signal is associated with a power delay profile including multiple channel taps received at different times, and/or means for forwarding the signal to the first wireless node using a cyclic prefix aligned with an earliest of the multiple channel taps that satisfies a threshold.

In some aspects, a control node includes means for determining an adjustment to one or more timing reference configurations associated with a wireless forwarding node configured to forward communications between a first wireless node and a second wireless node, and/or means for transmitting, to the wireless forwarding node, one or more timing adjustment commands that indicate the adjustment to the one or more timing reference configurations. The means for the control node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. Additionally, or alternatively, the means for the control node to perform operations described herein may include, for example, controller/processor 290, memory 292, and/or communication unit 294.

In some aspects, the control node includes means for transmitting, to one or more of the first wireless node or the second wireless node, one or more timing adjustment commands that indicate an adjustment to one or more timing reference configurations associated with communicating with the wireless forwarding node.

In some aspects, a transmitter node includes means for transmitting, to a wireless forwarding node, a signal to be forwarded to a wireless receiver node, wherein the wireless forwarding node is associated with a receive timing for receiving the signal from the transmitter node, means for determining an estimated timing offset to be applied to the receive timing associated with the wireless forwarding node based at least in part on the wireless forwarding node forwarding the signal back to the transmitter node, and/or means for transmitting, to the wireless forwarding node, a timing adjustment command that indicates the estimated timing offset to be applied to the receive timing. The means for the transmitter node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. Additionally, or alternatively, the means for the transmitter node to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the transmitter node includes means for transmitting, to the wireless forwarding node, an instruction to forward the signal back to the transmitter node, and/or means for receiving the forwarded signal from the wireless forwarding node based at least in part on the instruction.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
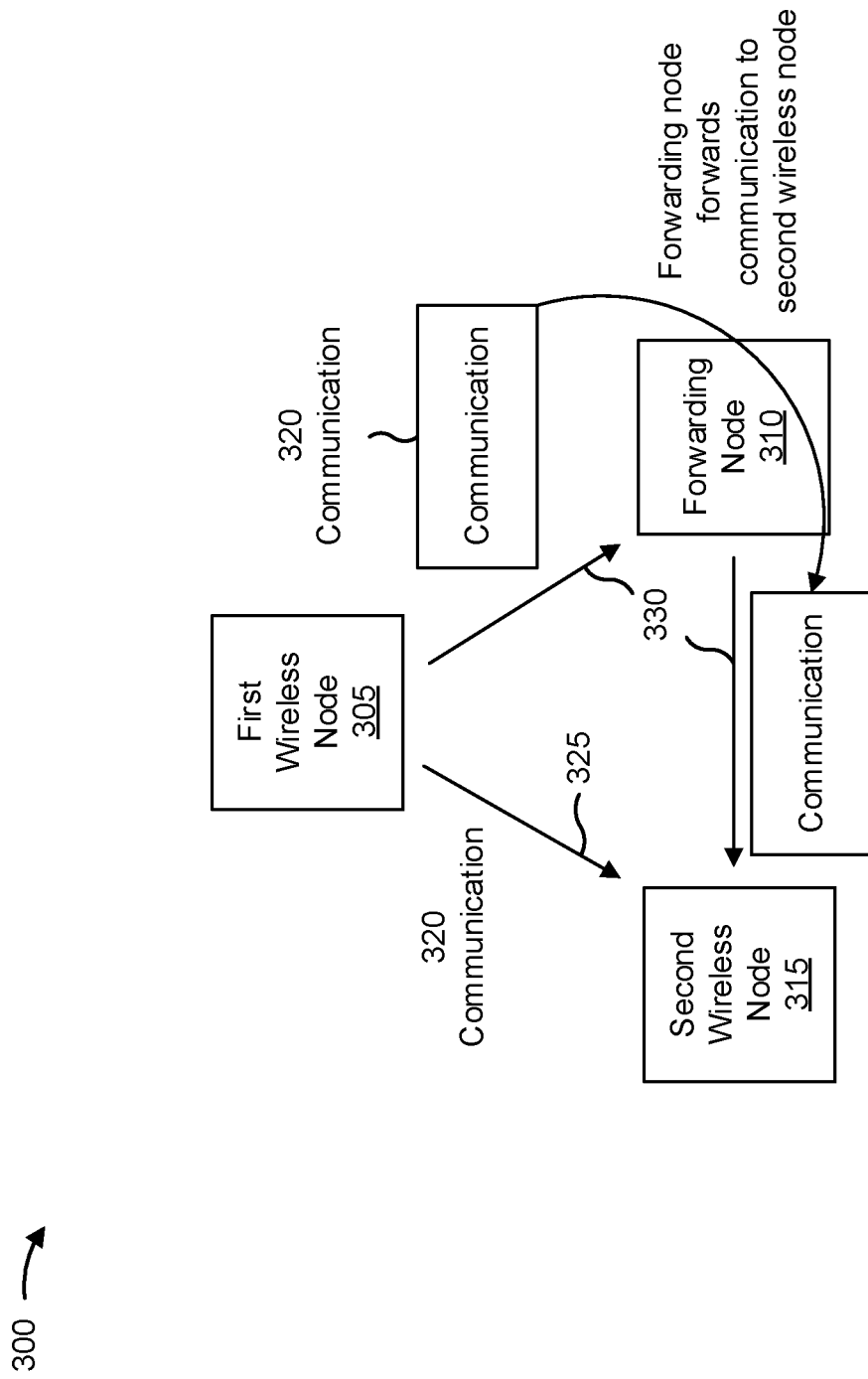
FIG. 3 is a diagram illustrating an example of a forwarding node that forwards communications between a first wireless node and a second wireless node, in accordance with the present disclosure.

FIG. 3 is a diagram illustrating an example 300 of a forwarding node (e.g., a repeater node or a relay node) that forwards communications between a first wireless node and a second wireless node, in accordance with the present disclosure. As shown, example 300 includes a first wireless node 305 (e.g., an IAB node, an IAB donor, a base station 110, a UE 120, and/or the like), a forwarding node 310 (e.g., a repeater device, a relay device, a base station 110, a UE 120, a millimeter wave (mmWave) repeater, a mmWave relay, a digital repeater, an analog repeater, a digital relay, an analog relay, and/or the like), and a second wireless node 315 (e.g., an IAB node, an IAB donor, a base station 110, a UE 120, another forwarding node 310, and/or the like). In some aspects, the first wireless node 305 and/or the second wireless node 315 may be aware of the forwarding node 310. In some aspects, the first wireless node 305 and/or the second wireless node 315 may be unaware of the forwarding node 310.

As shown in FIG. 3, the first wireless node 305 may have a communication 320 (e.g., a data communication, a control communication, and/or the like) to transmit to the second wireless node 315 using a direct link 325 (e.g., an access link and/or the like) between the first wireless node 305 and the second wireless node 315. However, the first wireless node 305 may be unable to transmit the communication 320 to the second wireless node 315 using the direct link 325. For example, the second wireless node 315 may be outside of a transmit range of the first wireless node 305, the direct link 325 may be blocked, and/or the like.

Therefore, the first wireless node 305 may communicate with the second wireless node 315 using an indirect link 330. For example, the first wireless node 305 may transmit the communication 320 to the forwarding node 310. In some aspects, the first wireless node 305 may transmit the communication 320 directly to the forwarding node 310 (e.g., in a case where the first wireless node 305 is aware of the forwarding node 310). In some aspects, the forwarding node 310 may be configured (e.g., by a control node, by the second wireless node 315, and/or the like) to receive the communication 320 from the first wireless node 305 (e.g., in a case where the first wireless node 305 is unaware of the forwarding node 310).

As shown in FIG. 3, the communication 320 may arrive at the forwarding node 310 and be forwarded by the forwarding node 310. In some aspects, the forwarding node 310 is a repeater node (or repeater unit), and the repeater node may regenerate a signal of the communication 320. For example, the repeater node may receive a signal of the communication 320, extract tones from the signal, regenerate the signal based at least in part on the extracted tones, and transmit the regenerated signal. In some aspects, the forwarding node 310 is a relay node (or relay unit), and the relay node may generate a new signal based at least in part on a signal of the communication 320. For example, the relay node may receive a downlink signal that carries information associated with a communication (e.g., in-phase and quadrature (IQ) samples), generate a new signal based at least in part on the information, and transmit the new signal. As another example, the relay node may receive an uplink signal, generate a new signal that carries information associated with the uplink signal (e.g., IQ samples), and transmit the new signal.

In some cases, the indirect link 330 may be an access link, a side link, or a fronthaul link. For example, if the first wireless node 305 is a base station 110 and the second wireless node 315 is a UE 120, the indirect link 330 between the first wireless node 305 and the forwarding node 310 may be a fronthaul link. The indirect link 330 between the forwarding node 310 and the second wireless node 315 may be an access link. Using the communication scheme shown in FIG. 3 may improve network performance and increase reliability by providing the first wireless node 305 and/or the second wireless node 315 with link diversity for communications, by extending a communication coverage area of the first wireless node 305 and/or the second wireless node 315, and/or the like.

As indicated above, FIG. 3 is provided as an example. Other examples may differ from what is described with respect to FIG. 3.

Figure 4:
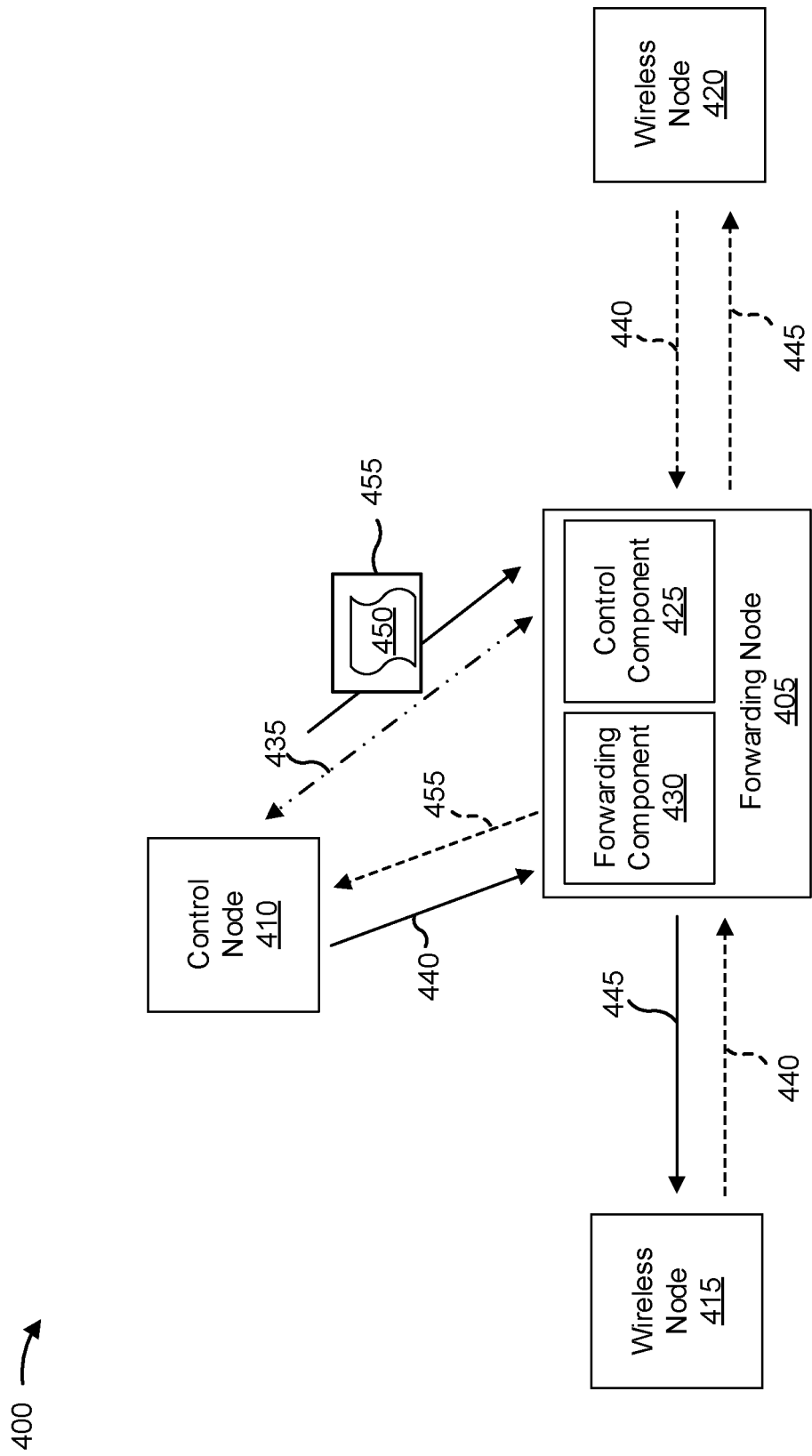
FIG. 4 is a diagram illustrating an example of forwarding a wireless signal using a forwarding node, in accordance with the present disclosure.

FIG. 4 is a diagram illustrating an example 400 of forwarding a wireless signal using a forwarding node 405, in accordance with the present disclosure. In some aspects, as shown, the forwarding node 405 may communicate with a control node 410 and one or more wireless nodes 415, 420 in a wireless network. In some aspects, the forwarding node 405 may include the forwarding node 310 shown in FIG. 3. In some aspects, the control node 410, the wireless node 415, and/or the wireless node 420 may be a wireless node such as, for example, the first wireless node 305 shown in FIG. 3, the second wireless node 315 shown in FIG. 3, an IAB node, an IAB donor, a base station 110 shown in FIG. 1, a UE 120 shown in FIG. 1, and/or the like.

In some aspects, the forwarding node 405 may be a digital repeater node (or repeater unit) configured to receive an incoming signal and to transmit a regenerated version of the incoming signal. For example, when implemented or otherwise configured as a digital repeater node, the forwarding node 405 may receive an incoming signal, extract tones from the incoming signal, regenerate the incoming signal based at least in part on the extracted tones, and transmit the regenerated signal as an outgoing signal. Additionally, or alternatively, the forwarding node 405 may be a digital relay node (or relay unit) configured to generate a new signal based at least in part on an incoming signal. For example, when implemented or otherwise configured as a digital relay node, the forwarding node 405 may receive a downlink signal (e.g., a fronthaul physical downlink shared channel (FH-PDSCH)) that carries information (e.g., IQ samples), generate a new downlink signal (e.g., a legacy physical downlink shared channel (PDSCH)) that carries information about and/or from the downlink signal (e.g., the IQ samples), and transmit the new downlink signal to a receiver. As another example, when implemented or otherwise configured as a digital relay node, the forwarding node 405 may receive an uplink signal (e.g., a legacy physical uplink shared channel (PUSCH)), generate a new uplink signal (e.g., an FH-PUSCH) that carries information associated with the uplink signal (e.g., IQ samples), and transmit the new uplink signal to a receiver.

As shown in FIG. 4, the forwarding node 405 may include a control component 425 and a forwarding component 430. In some aspects, the control component 425 may facilitate establishing a wireless control interface 435 between the forwarding node 405 and the control node 410. In some aspects, the control component 425 may include one or more components and/or functions that are, or are similar to, one or more components of a base station (e.g., the base station 110 shown in FIGS. 1 and 2), a UE (e.g., the UE 120 shown in FIGS. 1 and 2), and/or the like. In some aspects, the forwarding component 430 may perform one or more forwarding (e.g., repeating and/or relaying) operations based at least in part on information received by the control component over the wireless control interface 435. For example, a forwarding operation may include receiving a first signal 440, performing one or more digital processing operations on the first signal 440 to generate a second signal 445, and transmitting the second signal 445. The second signal 445 may be the result of the forwarding node 405 performing a repeating operation to regenerate the first signal 440 (e.g., through the one or more digital processing operations) such that $X' \approx X$, where X is the first signal 440 and X' is the second signal 445. Additionally, or alternatively, the second signal 445 may be the result of the forwarding node 405 performing a relaying operation. In this case, the forwarding node 405 may generate the second signal 445 to carry information about and/or from the first signal 440 (e.g., through the one or more digital processing operations) such that $Y=f(X)$, where X is the first signal 440, Y is the second signal 445, and f is a function based at least in part on one or more digital processing operations that the forwarding node 405 performs to generate the second signal 445.

In some aspects, the first signal 440 may include a communication (e.g., the communication 320 shown in FIG. 3) that is transmitted from the control node 410 and addressed to the wireless node 415. In some aspects, as shown, the first signal 440 may be transmitted from the control node 410 and addressed to the wireless node 415. In some aspects, the first signal 440 may be transmitted from the wireless node 415 or the wireless node 420 and addressed to the control node 410, addressed to the other wireless node 415 or wireless node 420, and/or the like. In some aspects, the first signal 440 may be addressed to a plurality of wireless nodes (e.g., wireless node 415, wireless node 420, control node 410, and/or the like). In some aspects, the first signal 440 may include a synchronization signal block (SSB) and/or remaining minimum system information (RMSI) communication, information associated with an SSB or RMSI communication, a physical downlink control channel (PDCCH) transmission, a PDSCH transmission, a physical uplink control channel (PUCCH) transmission, a PUSCH transmission, a physical sidelink control channel (PSCCH) transmission, a physical sidelink shared channel (PSSCH) transmission, an acknowledgement or negative acknowledgement (ACK/NACK) feedback message, and/or the like.

In some aspects, the forwarding component 430 may perform the one or more forwarding operations based at least in part on a configuration established using the control component 425. For example, in some aspects, the control node 410 may transmit configuration information 450 using a control message 455, and the forwarding node 405 may receive the control message 455 using the control component 425.

In some aspects, the control node 410 may transmit the configuration information 450 in the control message 455 via the wireless control interface 435. The configuration information 450 may be carried in at least one control message 455. In some aspects, control messages may be used to control communication between the forwarding node 405 and the control node 410 in accordance with a specification of the wireless control interface 435. In some aspects, the configuration information 450 may be carried in a lower-layer control message (e.g., a control message associated with physical layers and/or medium access control (MAC) layers), an upper-layer control message (e.g., a control message associated with network layers), an application-layer control message (e.g., a control message associated with an application layer), and/or the like. For example, a control message may be carried using a radio resource control (RRC) message, downlink control information (DCI), a MAC control element (MAC-CE), and/or the like.

In some aspects, a control message may be included within the first signal 440. In some aspects, the configuration information 450 may be carried in a fronthaul PDCCH (FH-PDCCH) control message. In some aspects, the FH-PDCCH control message may include DCI scrambled by a fronthaul radio network temporary identifier (FH-RNTI). The FH-RNTI may be associated with the control component 425.

In some aspects, the control message 455 may configure any number of different types of settings, configurations, digital processing operations, receiving operations, buffering operations, forwarding (transmitting) operations, and/or the like. In some aspects, the forwarding node 405 may transmit, and the control node 410 may receive, one or more control messages. For example, in some aspects, the forwarding node 405 may, using the control component 425, transmit a control message via the wireless control interface 435 to the control node 410. The control message transmitted by the forwarding node 405 may indicate a configuration, a capability, a status, and/or other information related to the forwarding node 405.

As indicated above, in some aspects, the control node 410 may configure the forwarding node 405 for a particular forwarding (e.g., repeating and/or relaying) operation by transmitting configuration information 450 to the forwarding node 405. In some aspects, the configuration information 450 may indicate a digital processing operation. The digital processing operation may include a digital processing option selected from a plurality of digital processing options (e.g., as described below in connection with FIG. 5 and FIGS. 6A-6B). In some aspects, the configuration information 450 may include one or more information elements (IEs) that indicate a reception configuration, a buffering configuration, a forwarding configuration, an information request, and/or the like.

In some aspects, the reception configuration may configure one or more receiving operations of the forwarding component 430 with respect to receiving the first signal 440. The reception configuration may indicate, for example, a receiving analog beamforming configuration, a time domain resource associated with the first signal 440, a frequency domain resource associated with the first signal 440, a numerology associated with the first signal 440, a digital receiver beamforming configuration, resource element (RE) mapping information associated with the first signal 440, a channel estimation configuration, a scrambling identifier associated with the first signal 440, a coding configuration associated with the first signal 440, and/or the like.

In some aspects, the buffering configuration may configure one or more buffering operations of the forwarding component 430 with respect to buffering a digitized form of the first signal 440. In some aspects, the buffering configuration may indicate an analog-to-digital converter (ADC) setting, a digital-to-analog converter (DAC) setting, an IQ sample compression setting, an IQ sample decompression setting, and/or the like.

In some aspects, the forwarding configuration may configure one or more forwarding operations of the forwarding component 430 with respect to transmitting the second signal 445, which may be a regenerated form of the first signal 440 or a new signal that carries information about and/or from the first signal 440. In some aspects, the forwarding configuration may include a transmission beamforming configuration, a time domain resource associated with transmitting the second signal, a transmission power setting, a transmission amplification setting, a transmission center frequency, a numerology associated with transmitting the second signal, a digital transmitter beamforming configuration, RE mapping information associated with transmitting the second signal, a layer mapping configuration, a precoding configuration, a scrambling identifier associated with transmitting the second signal, a coding configuration associated with transmitting the second signal, and/or the like.

In some aspects, the information request may configure one or more reporting operations of the forwarding component 430 with respect to providing information to the control node 410. The information may include information about the operation of the forwarding node 405, the configuration of the forwarding node 405, settings of the forwarding node 405, a channel, a communication, and/or the like. In some aspects, the information request may include a request for a buffer status, a power status, a measurement report, a capability of the digital repeater, a configuration of the forwarding node 405, and/or the like.

As indicated above, FIG. 4 is provided as an example. Other examples may differ from what is described with respect to FIG. 4.

Figure 5:
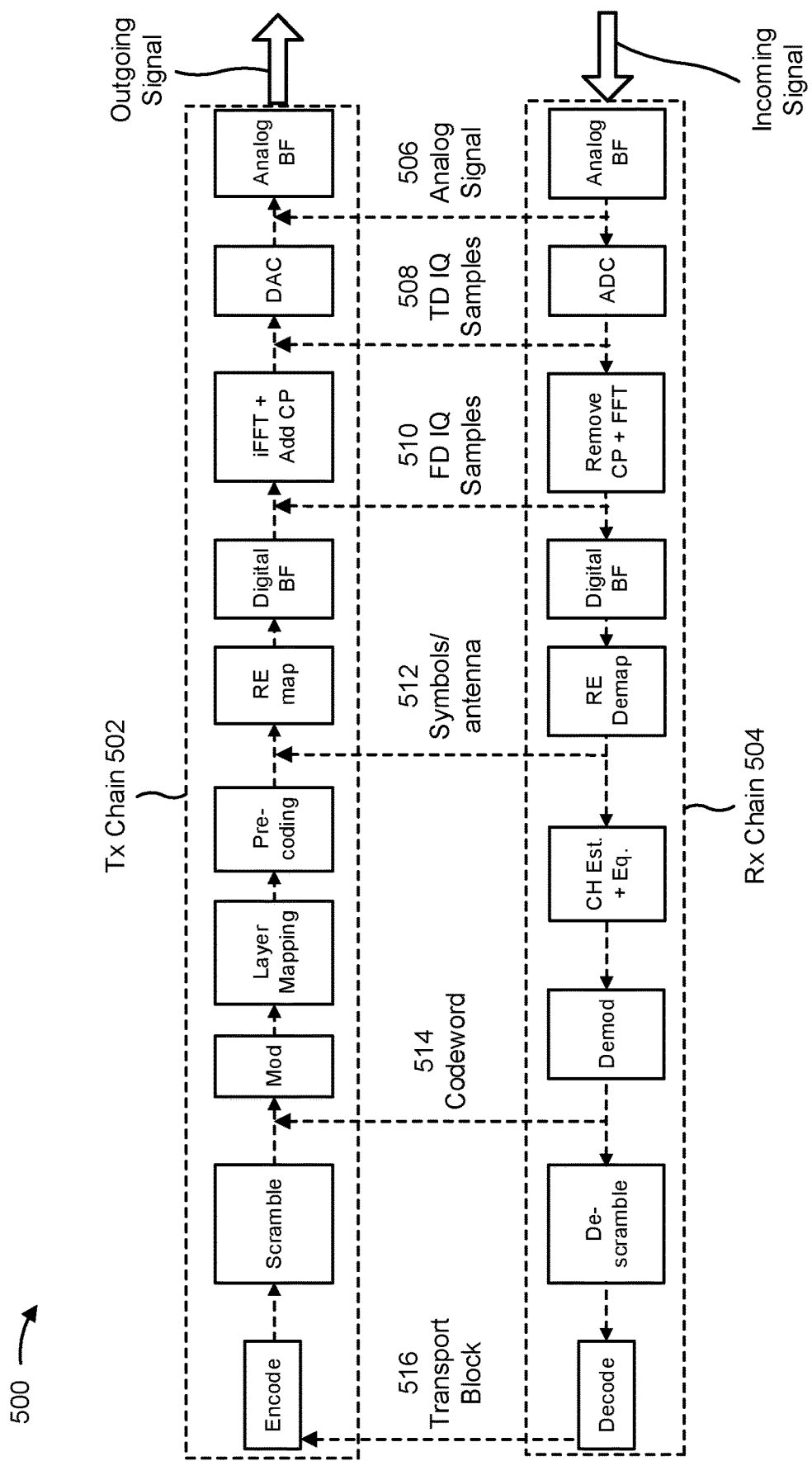
FIG. 5 is a diagram illustrating an example of a transmit (Tx) chain and a receive (Rx) chain of a forwarding node implemented as a repeater node, in accordance with the present disclosure.

FIG. 5 is a diagram illustrating an example 500 of a transmit (Tx) chain 502 and a receive (Rx) chain 504 of a forwarding node implemented as a repeater node, in accordance with the present disclosure.

In some aspects, one or more components of Tx chain 502 may be implemented in transmit processor 220, TX MIMO processor 230, MOD/DEMOD 232, controller/processor 240, and/or the like, as described above in connection with FIG. 2. In some aspects, Tx chain 502 may be implemented in a repeater node for transmitting an outgoing signal (e.g., uplink data, downlink data, an uplink reference signal, a downlink reference signal, uplink control information, downlink control information, and/or the like) associated with a repeating operation performed by the repeater node.

In some aspects, one or more components of Rx chain 504 may be implemented in receive processor 238, MIMO detector 236, MOD/DEMOD 232, controller/processor 240, and/or the like, as described above in connection with FIG. 2. In some aspects, Rx chain 504 may be implemented in a repeater node for receiving an incoming signal (e.g., downlink data, uplink data, a downlink reference signal, an uplink reference signal, downlink control information, uplink control information, and/or the like) associated with a repeating operation performed by the repeater node.

As shown in FIG. 5 and example 500, the incoming signal may be a downlink signal that is received over a fronthaul link from a DU of an IAB node, a base station 110, and/or the like, and the outgoing signal may be a regenerated version of the downlink signal that is transmitted over an access link to an MT unit of an IAB node, a UE 120, and/or the like. Additionally, or alternatively, the incoming signal may be an uplink signal that is received over an access link from an MT unit of an IAB node, a UE 120, and/or the like, and the outgoing signal may be a regenerated version of the uplink signal that is transmitted over a fronthaul link to a DU of an IAB node, a base station 110, and/or the like. Accordingly, as described herein, repeating operations performed by the repeater node may be symmetric for downlink and uplink signals. Furthermore, in some aspects, the device transmitting the incoming signal and/or the device receiving the outgoing signal may be unaware of the repeater node (e.g., the repeating operations may be transparent to the transmitting device and/or the receiving device).

As shown in FIG. 5, the incoming signal may be processed by the Rx chain 504. For example, as described herein, the repeater node may perform different levels of analog and/or digital processing to regenerate the incoming signal as the outgoing signal. The level of processing performed by the repeater node may be based at least in part on a configuration received by the repeater node (e.g., from a control node and/or the like). For example, as shown by reference number 506 (which shows what may be referred to as Split Option 9), the repeater node may perform analog beamforming on the incoming signal, and may provide an analog signal to the Tx chain 502. The repeater node may then perform analog beamforming on the analog signal to transmit the outgoing signal to the receiving device. In this case, the repeater node may be configured as an analog repeater.

Additionally, or alternatively, the repeater node may be configured as a digital repeater, in which case the repeater node may further process the incoming signal. For example, as shown by reference number 508 (which shows what may be referred to as Split Option 8), the repeater node may process the analog signal by converting the incoming signal from the analog domain to the digital domain using an ADC to determine time domain IQ samples associated with the incoming signal. Accordingly, in some aspects, the repeater node may process the time domain IQ samples using a DAC to regenerate the analog signal, which is then transmitted using analog beamforming.

Additionally, or alternatively, as shown by reference number 510 (which shows what may be referred to as Split Option 7-1), the repeater node may further process the incoming signal to determine frequency domain IQ samples associated with the incoming signal by removing a cyclic prefix (CP) from the time domain IQ samples and performing a fast Fourier transform (FFT). In this case, the repeater node may generate the outgoing signal by then performing an inverse FFT (iFFT) on the frequency domain IQ samples and adding a CP to obtain time domain IQ samples, converting the time domain IQ samples to an analog signal using a DAC, and transmitting the analog signal using analog beamforming.

Additionally, or alternatively, as shown by reference number 512 (which shows what may be referred to as Split Option 7-2), the repeater node may further process the incoming signal to determine symbols per antenna (e.g., IQ symbols of occupied tones) associated with the incoming signal. For example, the repeater node may perform a digital beamforming process on the frequency domain IQ samples (e.g., based at least in part on a digital Tx beamforming configuration), and may further perform an RE demapping based at least in part on an RE mapping configuration received by the repeater node to identify REs of the incoming signal and/or occupied tones. The repeater node may generate the outgoing signal by processing the symbols per antenna (e.g., IQ symbols of occupied tones) using an RE mapping and digital beamforming information.

Additionally, or alternatively, as shown by reference number 514 (which shows what may be referred to as Split Option 7-3), the repeater node may further process the incoming signal to determine a codeword (e.g., log likelihood ratio (LLR) values and/or the like) associated with the incoming signal. For example, the repeater node may determine the codeword by performing channel estimation and channel equalization on the IQ symbols of occupied tones (e.g., to identify and/or remove noise associated with the incoming signal) and by performing a demodulation procedure on the incoming signal. In this case, the repeater node may generate the outgoing signal by modulating the codeword, performing a layer mapping, applying pre-coding, performing an RE mapping, performing digital Tx beamforming, applying an iFFT and/or adding a CP, converting the signal from the digital domain to the analog domain using a DAC, and performing analog beamforming to transmit the outgoing signal.

Additionally, or alternatively, as shown by reference number 516 (which shows what may be referred to as Split Option 6), the repeater node may further process the incoming signal to obtain a transport block associated with the incoming signal (e.g., the repeater node may fully decode the incoming signal). For example, the repeater node may obtain the transport block by descrambling the codeword (e.g., using a scrambling identifier associated with the incoming signal) and decoding the descrambled codeword (e.g., based at least in part on an MCS associated with the incoming signal). In this case, the repeater node may generate the outgoing signal by encoding the transport block according to a Tx MCS, scrambling the encoded transport block to regenerate the codeword, modulating the codeword and performing a layer mapping and pre-coding to regenerate the symbols per antenna, performing an RE mapping and digital Tx beamforming to regenerate the frequency domain IQ samples, applying an iFFT and/or adding a CP to the frequency domain IQ samples to regenerate the time domain IQ samples, converting the time domain IQ samples from the digital domain to the analog domain with a DAC, and performing analog beamforming on the analog signal in the analog domain to transmit the outgoing signal.

In some aspects, the level of processing that the repeater node performs on the incoming signal may be configured by a control node or another wireless node. The outgoing signal may be a regenerated version of the incoming signal that is based at least in part on the level of processing performed by the repeater node.

The number and arrangement of components shown in FIG. 5 is provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

Figure 6A:
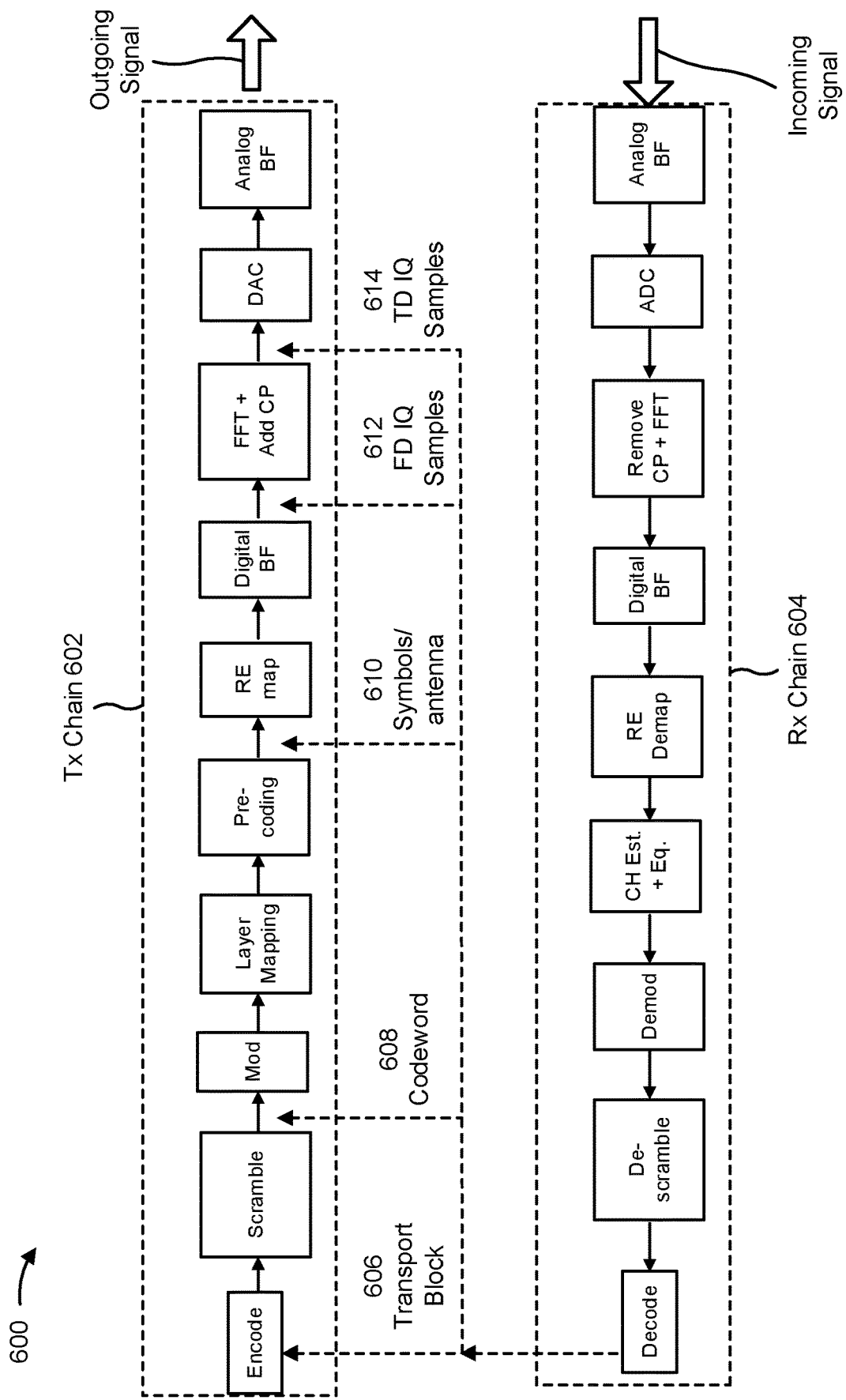
FIGS. 6A-6B are diagrams illustrating examples of a Tx chain and an Rx chain of a forwarding node implemented as a relay node, in accordance with the present disclosure.
Figure 6B:
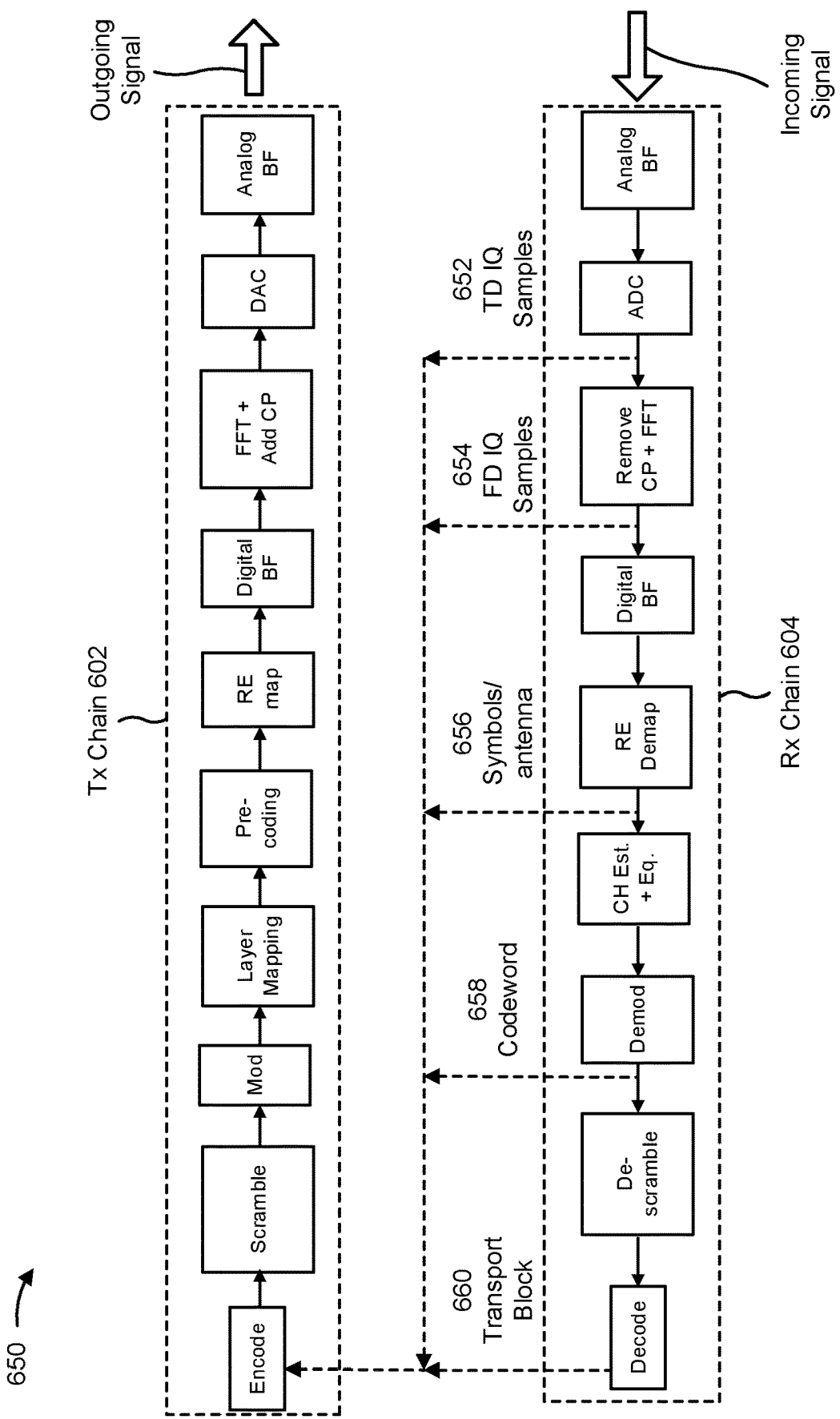

FIGS. 6A-6B are diagrams illustrating examples 600 and 650 of a Tx chain 602 and an Rx chain 604 of a forwarding node implemented as a relay node, in accordance with the present disclosure.

In some aspects, one or more components of Tx chain 602 may be implemented in transmit processor 220, TX MIMO processor 230, MOD/DEMOD 232, controller/processor 240, and/or the like, as described above in connection with FIG. 2. In some aspects, Tx chain 602 may be implemented in a relay node for transmitting an outgoing signal (e.g., uplink data, downlink data, an uplink reference signal, a downlink reference signal, uplink control information, downlink control information, and/or the like) associated with a relaying operation performed by the relay node.

In some aspects, one or more components of Rx chain 604 may be implemented in receive processor 238, MIMO detector 236, MOD/DEMOD 232, controller/processor 240, and/or the like, as described above in connection with FIG. 2. In some aspects, Rx chain 604 may be implemented in a relay node for receiving an incoming signal (e.g., downlink data, uplink data, a downlink reference signal, an uplink reference signal, downlink control information, uplink control information, and/or the like) associated with a relaying operation performed by the relay node.

As shown in FIG. 6A and example 600, the incoming signal may be received by the relay node over a fronthaul link. For example, the incoming signal may be a downlink signal received from a DU of an IAB node, a base station 110, and/or the like. As shown in FIG. 6A, the incoming signal may be processed by the Rx chain 604. For example, the relay node may fully decode the incoming signal to obtain information (e.g., a payload) carried in the incoming signal. The relay node may perform analog beamforming on the incoming signal. The relay node may convert the incoming signal from the analog domain to the digital domain using an ADC. The relay node may remove a CP and/or an FFT associated with the incoming signal. The relay node may perform a digital beamforming process on the incoming signal (e.g., based at least in part on a digital Tx beamforming configuration). The relay node may perform an RE de-mapping procedure based at least in part on an RE mapping configuration received by the relay node to identify REs of the signal and/or occupied tones. The relay node may perform channel estimation and channel equalization on the incoming signal (e.g., to identify and/or remove noise associated with the incoming signal). The relay node may perform a demodulation procedure on the incoming signal. The relay node may de-scramble the incoming signal (e.g., using scrambling IDs associated with the incoming signal). The relay node may decode the incoming signal (e.g., based at least in part on an MCS associated with the incoming signal).

After decoding the incoming signal, the relay node may identify information carried by the incoming signal. For example, a payload of the incoming signal may include time domain IQ samples, frequency domain IQ samples, symbols per antenna (e.g., IQ symbols of occupied tones), a codeword, a transport block, and/or the like. The relay node may generate an outgoing signal using the Tx chain 602. An amount or level of processing performed by the relay node associated with the Tx chain 602 may be based at least in part on the information carried by the incoming signal, a configuration received by the relay node (e.g., from a control node and/or the like), and/or the like.

As shown by reference number 606 (which shows Split Option 6), if the incoming signal is carrying a transport block, the relay node may generate the outgoing signal by fully encoding the transport block to form the outgoing signal (e.g., by encoding the transport block according to a Tx MCS, scrambling the encoded transport block, modulating the scrambled transport block, performing layer mapping, pre-coding, performing digital Rx beamforming, applying an FFT and/or adding a CP, converting the signal from the digital domain to the analog domain with a DAC, performing analog beamforming, and transmitting the outgoing signal).

As shown by reference number 608 (which shows Split Option 7-3), if the incoming signal is carrying a codeword, the relay node may not perform encoding or scrambling to generate the outgoing signal. That is, the relay node may modulate the codeword, perform layer mapping, perform pre-coding, perform digital Tx beamforming, apply an FFT and/or add a CP, convert the signal from the digital domain to the analog domain with a DAC, perform analog beamforming, and transmit the outgoing signal.

As shown by reference number 610 (which shows Split Option 7-2), if the incoming signal is carrying an indication of symbols per antenna (e.g., IQ symbols of occupied tones), the relay node may not perform encoding, scrambling, modulating, layer mapping, and/or pre-coding. That is, the relay node may perform digital Rx beamforming to the IQ symbols of occupied tones, apply an FFT and/or add a CP, convert the signal from the digital domain to the analog domain with a DAC, perform analog beamforming, and transmit the outgoing signal.

As shown by reference number 612 (which shows Split Option 7-1), if the incoming signal is carrying frequency domain IQ samples, the relay node may not perform encoding, scrambling, modulating, layer mapping, pre-coding, and/or digital beamforming. That is, the relay node may apply an FFT and/or add a CP to the frequency domain IQ samples, convert the signal from the digital domain to the analog domain with a DAC, perform analog beamforming, and transmit the outgoing signal.

As shown by reference number 614 (which shows Split Option 8), if the incoming signal is carrying time domain IQ samples, the relay node may not perform encoding, scrambling, modulating, layer mapping, pre-coding, digital beamforming, and/or applying an FFT and/or adding a CP. That is, the relay node may convert the time domain IQ samples from the digital domain to the analog domain with a DAC, perform analog beamforming, and transmit the outgoing signal.

As a result, the level of digital processing used to generate the outgoing signal may vary based at least in part on information carried by the incoming signal. As described above, the relay node may process the incoming signal to identify information included in a payload of the incoming signal. The relay node may generate an outgoing signal that includes information about and/or from the incoming signal based at least in part on the information carried by the incoming signal. In some aspects, a device receiving the outgoing signal may be unaware of the relay node (e.g., the relaying operations may be transparent to the receiving device).

As shown in FIG. 6B and example 650, the incoming signal may be received by the relay node over an access link. For example, the incoming signal may be an uplink signal received from an MT unit of an IAB node, a UE 120, and/or the like. In some aspects, the device transmitting the incoming signal may be unaware of the relay node (e.g., the relaying operations may be transparent to the transmitting device).

The relay node may perform different levels of digital processing to determine information associated with the incoming signal. The level of processing may be based at least in part on a configuration received by the relay node (e.g., from a control node and/or the like). For example, as shown by reference number 652 (which shows Split Option 8), the relay node may process the incoming signal to determine time domain IQ samples associated with the incoming signal. The relay node may generate the outgoing signal by processing the time domain IQ samples and including them in a payload of the outgoing signal (e.g., by fully encoding a transport block indicating the time domain IQ samples). The outgoing signal may be transmitted using a fronthaul link to another wireless node.

As shown by reference number 654 (which shows Split Option 7-1), the relay node may process the incoming signal to determine frequency domain IQ samples associated with the incoming signal. The relay node may generate the outgoing signal by processing the frequency domain IQ samples and including them in a payload of the outgoing signal (e.g., by fully encoding a transport block indicating the frequency domain IQ samples). The outgoing signal may be transmitted using a fronthaul link to another wireless node.

As shown by reference number 656 (which shows Split Option 7-2), the relay node may process the incoming signal to determine symbols per antenna (e.g., IQ symbols of occupied tones) associated with the incoming signal. The relay node may generate the outgoing signal by processing the symbols per antenna (e.g., IQ symbols of occupied tones) and including them in a payload of the outgoing signal (e.g., by fully encoding a transport block indicating the symbols per antenna (e.g., IQ symbols of occupied tones)). The outgoing signal may be transmitted using a fronthaul link to another wireless node.

As shown by reference number 658 (which shows Split Option 7-3), the relay node may process the incoming signal to determine a received codeword (e.g., LLR values and/or the like) associated with the incoming signal. The relay node may generate the outgoing signal by processing the received codeword and including it in a payload of the outgoing signal (e.g., by fully encoding a transport block indicating the received codeword). The outgoing signal may be transmitted using a fronthaul link to another wireless node.

As shown by reference number 660 (which shows Split Option 8), the relay node may process the incoming signal to determine a transport block associated with the incoming signal (e.g., the relay node may fully decode the incoming signal). The relay node may generate the outgoing signal by processing the transport block and including the transport block in a payload of the outgoing signal (e.g., by fully encoding a transport block). The outgoing signal may be transmitted using a fronthaul link to another wireless node.

The level of processing performed on the incoming signal may be configured by a control node or another wireless node. The outgoing signal may include information about and/or from the incoming signal based at least in part on the level of processing performed by the relay node.

The number and arrangement of components shown in FIGS. 6A-6B are provided as an example. In practice, there may be additional components, fewer components, different components, or differently arranged components than those shown in FIGS. 6A-6B. Furthermore, two or more components shown in FIGS. 6A-6B may be implemented within a single component, or a single component shown in FIGS. 6A-6B may be implemented as multiple, distributed components. Additionally, or alternatively, a set of components (e.g., one or more components) shown in FIGS. 6A-6B may perform one or more functions described as being performed by another set of components shown in FIGS. 6A-6B.

Figure 7:
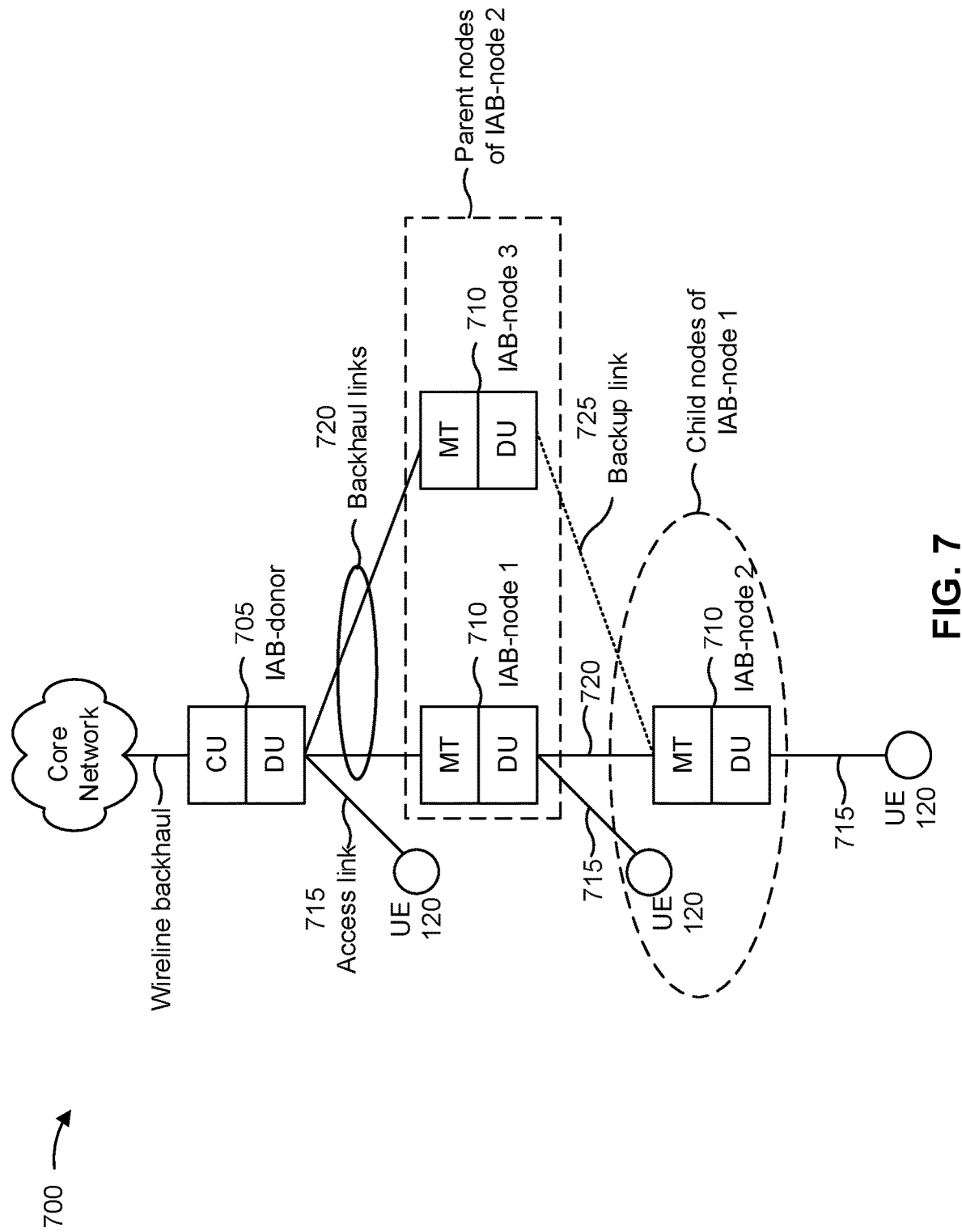
FIG. 7 is a diagram illustrating an example of an integrated access and backhaul network architecture, in accordance with the present disclosure.

FIG. 7 is a diagram illustrating an example 700 of an IAB network architecture, in accordance with the present disclosure.

As shown in FIG. 7, an IAB network may include an IAB donor 705 (shown as IAB-donor) that connects to a core network via a wired connection (shown as a wireline backhaul). For example, an Ng interface of an IAB donor 705 may terminate at a core network. Additionally, or alternatively, an IAB donor 705 may connect to one or more devices of the core network that provide a core access and mobility management function (e.g., AMF). In some aspects, an IAB donor 705 may include a base station 110, such as an anchor base station that communicates with a core network via a wired backhaul link (e.g., a fiber connection). As shown, an IAB donor 705 may include a central unit (CU), which may perform access node controller (ANC) functions, AMF functions, and/or the like. The CU may configure a DU of the IAB donor 705 and/or may configure one or more IAB nodes 710 (e.g., an MT and/or a DU of an IAB node 710) that connect to the core network via the IAB donor 705. Thus, a CU of an IAB donor 705 may control and/or configure the entire IAB network that connects to the core network via the IAB donor 705, such as by using control messages and/or configuration messages (e.g., an RRC configuration message, an F1 application protocol (FLAP) message, and/or the like).

As further shown in FIG. 7, the IAB network may include IAB nodes 710 (shown as IAB-node 1, IAB-node 2, and IAB-node 3) that connect to the core network via the IAB donor 705. As shown, an IAB node 710 may include MT functions (also sometimes referred to as UE functions (UEF)) and may include DU functions (also sometimes referred to as access node functions (ANF)). The MT functions of an IAB node 710 (e.g., a child node) may be controlled and/or scheduled by another IAB node 710 (e.g., a parent node of the child node) and/or by an IAB donor 705. The DU functions of an IAB node 710 (e.g., a parent node) may control and/or schedule other IAB nodes 710 (e.g., child nodes of the parent node) and/or UEs 120. Thus, a DU may be referred to as a scheduling node or a scheduling component, and an MT may be referred to as a scheduled node or a scheduled component. In some aspects, an IAB donor 705 may include DU functions and not MT functions. That is, an IAB donor 705 may configure, control, and/or schedule communications of IAB nodes 710 and/or UEs 120. A UE 120 may include only MT functions, and not DU functions. That is, communications of a UE 120 may be controlled and/or scheduled by an IAB donor 705 and/or an IAB node 710 (e.g., a parent node of the UE 120).

When a first node controls and/or schedules communications for a second node (e.g., when the first node provides DU functions for the MT functions of the second node), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 705 or an IAB node 710, and a child node may be an IAB node 710 or a UE 120. Communications of an MT function of a child node may be controlled and/or scheduled by a parent node of the child node.

As further shown in FIG. 7, a link between a UE 120 (e.g., which only has MT functions, and not DU functions) and an IAB donor 705, or between a UE 120 and an IAB node 710, may be referred to as an access link 715. Access link 715 may be a wireless access link that provides a UE 120 with radio access to a core network via an IAB donor 705, and optionally via one or more IAB nodes 710. Thus, the IAB network architecture illustrated in FIG. 7 may be referred to as a multi-hop network and/or a wireless multi-hop network, among other examples.

As further shown in FIG. 7, a link between an IAB donor 705 and an IAB node 710 or between two IAB nodes 710 may be referred to as a backhaul link 720. Backhaul link 720 may be a wireless backhaul link that provides an IAB node 710 with radio access to a core network via an IAB donor 705, and optionally via one or more other IAB nodes 710. In an IAB network, network resources for wireless communications (e.g., time resources, frequency resources, spatial resources, and/or the like) may be shared between access links 715 and backhaul links 720. In some aspects, a backhaul link 720 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 725 between IAB-node 2 and IAB-node 3 may be used for backhaul communications if a primary backhaul link between IAB-node 2 and IAB-node 1 fails. As used herein, "node" or "wireless node" may refer to an IAB donor 705 and/or an IAB node 710, among other examples.

Accordingly, in some communications systems, such as 5G or NR, a multi-hop network such as an IAB network may be deployed to enable communication between wireless nodes of the network. In general, the wireless nodes that are deployed in the multi-hop network may be associated with a timing scheme or timing configuration that enables alignment of communications between wireless nodes associated with different links. For example, one or more timing references may be used to identify a set of communication opportunities, such as a set of symbols or a set of slots that are allocated for a set of channels. For example, in an IAB network, the timing references may include a downlink transmit timing that an upstream node (e.g., a DU of an IAB donor 705 and/or a DU of an IAB node 710) uses to transmit one or more downlink signals to a downstream node (e.g., a UE 120 and/or an MT of a child IAB node 710). Furthermore, the timing references may include a downlink receive timing that the downstream node uses to receive the downlink signals from the upstream node, an uplink transmit timing that the downstream node uses to transmit uplink signals to the upstream node, and/or an uplink receive timing that the upstream node uses to receive the uplink signals from the downstream node. The downlink transmit timing may generally be aligned across all upstream nodes, and a threshold time misalignment may be tolerated for the uplink transmit timing to account for different propagation delays and/or round-trip times between upstream and downstream nodes.

Some aspects described herein enable a timing framework to adjust various timing references for a wireless forwarding node deployed in a multi-hop network (e.g., to extend coverage of a base station and/or enable communication between two nodes that may otherwise be outside of wireless communication range). For example, in some aspects, the wireless forwarding node may be configured to communicate with a first wireless node using a first timing reference configuration and with a second wireless node using a second timing reference configuration. For example, the first timing reference configuration may include timing references associated with transmitting signals to and receiving signals from the first wireless node, and the second timing reference configuration may include timing references associated with transmitting signals to and receiving signals from the second wireless node. In some aspects, the wireless forwarding node may establish transmit and receive timing references (e.g., symbol-level alignments) for the first timing reference configuration and the second timing reference configuration, and may adjust or fine-tune the transmit and receive timing references (e.g., at a sub-symbol-level and/or a sample-level) autonomously and/or based on one or more timing adjustment commands provided by a control node (e.g., based on timing estimation feedback provided to the control node). In this way, the adjustment of the timing references may increase synchronization among different nodes in the multi-hop network, which may improve accuracy of positioning determinations, increase a number of hops supported in the multi-hop network, and/or reduce interference in the multi-hop network, among other examples.

As indicated above, FIG. 7 is provided as an example. Other examples may differ from what is described with regard to FIG. 7.

Figure 8:
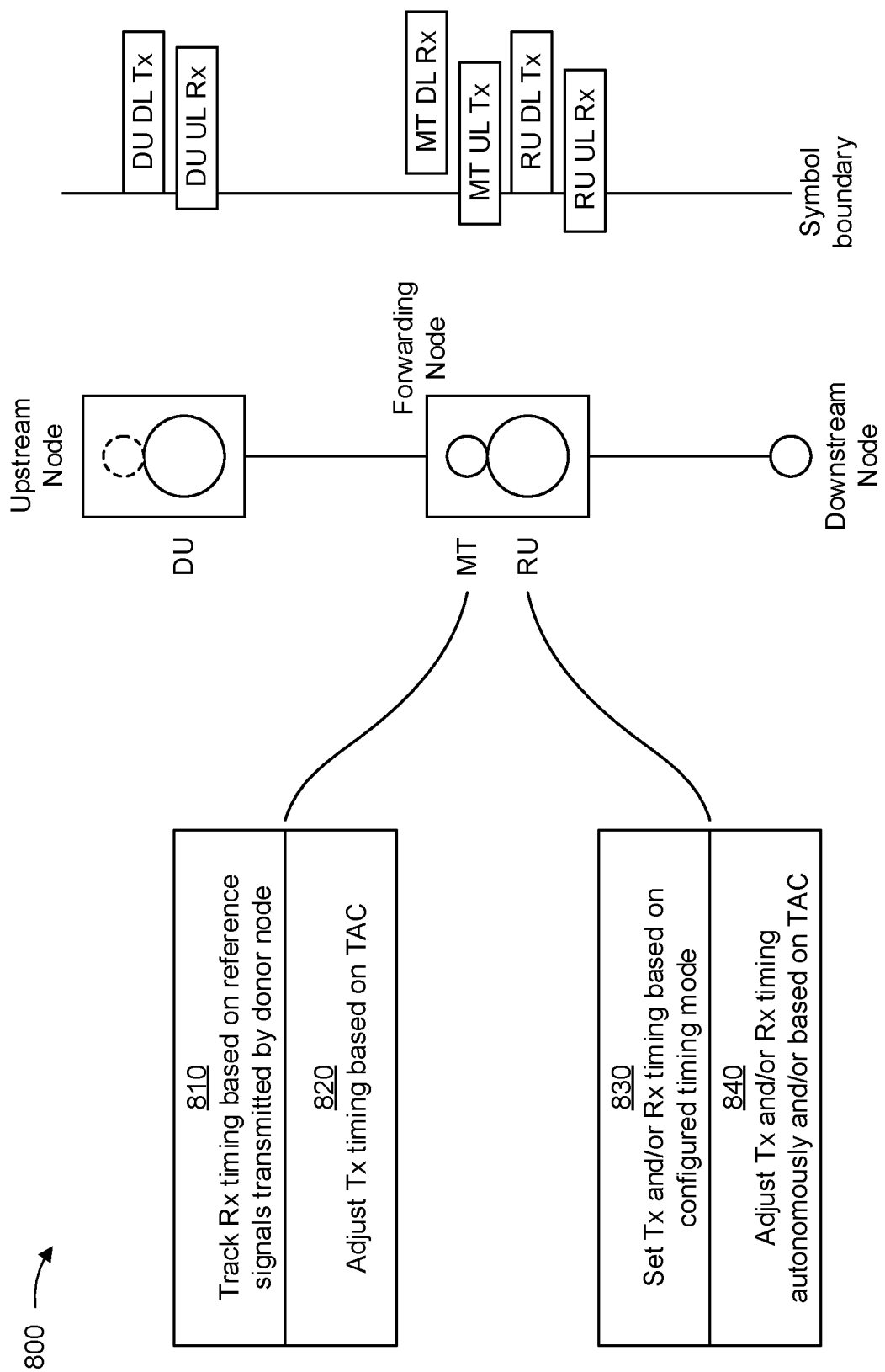
FIGS. 8-10 are diagrams illustrating examples associated with timing adjustment for wireless remote units, in accordance with the present disclosure.

FIG. 8 is a diagram illustrating an example 800 associated with timing adjustment for wireless remote units, in accordance with the present disclosure. As shown in FIG. 8, example 800 includes a wireless forwarding node configured to forward communications between an upstream wireless node (e.g., a base station DU, a DU of a donor node or a parent node, and/or a UE, among other examples) and a downstream wireless node (e.g., a UE and/or an MT of a child node, among other examples). For example, as shown in FIG. 8, the wireless forwarding node may include an MT unit configured to receive downlink communications from the upstream wireless node, and an RU (e.g., a repeater unit and/or a relay unit) configured to receive uplink communications from the downstream wireless node. Accordingly, as described herein, the wireless forwarding node may use the MT unit to forward the uplink communications to the upstream wireless node, and may use the RU to forward the downlink communications to the downstream wireless node. However, it will be appreciated that, in some aspects, the MT unit may be used to only communicate with a control node (e.g., to transmit and/or receive signals that relate to controlling operation of the wireless forwarding node), and the RU may be used to communicate with the upstream wireless node and the downstream wireless node to perform data forwarding operations. Furthermore, although various aspects described herein relate to timing adjustment techniques that may be used to adjust or fine-tune timing references that are associated with forwarding downlink and uplink communications between upstream and downstream wireless nodes, the same or similar techniques may be used to forward sidelink, downlink, and/or uplink communications in a flat, non-hierarchical topology.

As shown in FIG. 8, the MT of the wireless forwarding node may be in communication with the upstream wireless node, which may correspond to a parent node or a donor node using the wireless forwarding node to extend coverage, and the RU of the wireless forwarding node may be in communication with the downstream wireless node, which may correspond to a UE, a child node, or another node that is communicating with the upstream wireless node through the wireless forwarding node. Accordingly, in order to forward a downlink signal to the downstream wireless node, the upstream wireless node may transmit the downlink signal to the MT of the wireless forwarding node, and the wireless forwarding node may use the co-located RU to perform digital processing on the downlink signal (e.g., depending on the split option implemented by the RU) and forward the downlink signal to the downstream wireless node. Furthermore, similar techniques may be used for forwarding in the uplink direction, whereby the downstream wireless node may transmit the uplink signal to the RU of the wireless forwarding node, which may perform digital processing on the uplink signal (e.g., depending on the split option implemented by the RU) before using the MT to forward the uplink signal to the upstream wireless node.

Accordingly, in some aspects, a first timing reference configuration may define timing references that the MT uses to receive downlink signals from the upstream wireless node and to transmit uplink signals to the upstream wireless node, and a second timing reference configuration may define timing references that the RU uses to transmit downlink signals to the downstream wireless node and to receive uplink signals from the downstream wireless node. For example, as described in further detail herein, the timing reference configurations may generally indicate an alignment for one or more symbol boundaries (e.g., a symbol-level alignment) associated with the wireless forwarding node forwarding downlink communications from the upstream wireless node to the downstream wireless node, forwarding uplink communications from the downstream wireless node to the upstream wireless node, and/or the like. In some aspects, the symbol-level alignment may then be fine-tuned or otherwise adjusted (e.g., to account for a digital processing latency of the wireless forwarding node, a propagation delay between the wireless forwarding node and the upstream wireless node and/or the downstream wireless node, and/or the like) based on estimated timing offsets, timing estimation feedback, timing adjustment commands, and/or the like.

For example, as shown in FIG. 8, and by reference number 810, the wireless forwarding node may track a downlink receive timing (e.g., a symbol-level alignment) for receiving downlink signals from the upstream wireless node based on one or more reference signals transmitted by a donor node (e.g., the upstream wireless node). In this case, a component of the wireless forwarding node that communicates with the donor node (e.g., the MT of the wireless forwarding node and/or the RU of the wireless forwarding node) may determine the downlink receive timing according to IAB rules that are generally applicable to UEs. For example, the downlink receive timing associated with the wireless forwarding node may be offset (e.g., delayed) with respect to a downlink transmit timing of the upstream wireless node, and the offset may be based at least in part on a propagation delay between the upstream wireless node and the wireless forwarding node. For example, in some aspects, the upstream wireless node may be configured to transmit one or more downlink reference signals (e.g., an SSB, a channel state information reference signal (CSI-RS), a DMRS, a tracking reference signal (TRS), and/or the like), and the MT of the wireless forwarding node may track the downlink receive timing based on a time when the downlink reference signals are received.

As further shown in FIG. 8, and by reference number 820, the wireless forwarding node may adjust an uplink transmit timing for transmitting a signal to the upstream wireless node (e.g., a forwarded uplink signal) based at least in part on one or more timing advance commands that are received from a control node. For example, the upstream wireless node may permit uplink transmissions to be received at the upstream wireless node within a threshold time before or after the symbol boundary that is aligned with the downlink transmit timing of the upstream wireless node. Accordingly, uplink transmissions by the wireless forwarding node may be scheduled to occur prior to the symbol boundary based on the propagation delay between the upstream wireless node and the wireless forwarding node, which may be determined based on a delta between the downlink transmit timing of the upstream wireless node and the wireless forwarding node. In some aspects, the wireless forwarding node may receive a timing advance command from a control node, which may indicate an amount of time by which the wireless forwarding node is to advance the uplink transmit timing (e.g., based on timing estimation feedback provided to the control node to indicate the propagation delay and/or round trip time between the upstream wireless node and the wireless forwarding node). In this way, the uplink transmit timing may be adjusted (e.g., advanced) with respect to the downlink transmit timing of the upstream wireless node such that the upstream wireless node receives uplink signals transmitted by the wireless forwarding node within the threshold time of the symbol boundary aligned with the downlink timing of the upstream wireless node.

As further shown in FIG. 8, and by reference number 830, the wireless forwarding node may set a transmit timing reference and/or a receive timing reference for communicating with the downstream node according to a selected timing mode. In some aspects, the selected timing mode may be preconfigured (e.g., defined in a wireless communication standard, based on stored configuration information, based on a type or configuration of the wireless forwarding node, and/or the like), or the selected timing mode may be signaled to the wireless forwarding node or otherwise configured by a control node (e.g., the upstream wireless node or another node separate from the upstream wireless node). For example, in some aspects, the wireless forwarding node may set a downlink transmit timing to be aligned with a downlink transmit timing of the upstream wireless node (e.g., such that downlink transmissions by all network nodes are aligned at a symbol-level). Additionally, or alternatively, in cases where the wireless forwarding node supports almost zero-delay forwarding (e.g., where the RU implements a split option that results in a digital processing latency that is less than or equal to, or otherwise satisfies, a threshold), the wireless forwarding node may align a downlink or uplink transmit timing with a downlink or uplink receive timing plus epsilon, where epsilon represents the digital processing latency of the wireless forwarding node. Additionally, or alternatively, in cases where the wireless forwarding node supports concurrent communications or enhanced duplexing using spatial division multiplexing (SDM) and/or full-duplexing (FD), the wireless forwarding node may align timings of the concurrent communications to mitigate interference. In another example, in cases where the wireless forwarding node uses a guard period to switch between transmit and receive operations that are time division multiplexed (TDMed) on adjacent time resources, the wireless forwarding node may align transmit and receive timings (e.g., a downlink receive timing and a downlink transmit timing) to reduce the guard period.

As further shown in FIG. 8, and by reference number 840, the wireless forwarding node may adjust the transmit timing and/or the receive timing used to communicate with the downstream wireless node autonomously and/or based on one or more timing advance commands that are received from the control node. For example, as described above, the wireless forwarding node may set a downlink transmit timing and an uplink receive timing for the RU to communicate with the downstream wireless node according to a selected timing mode, which may indicate a symbol-level alignment for the downlink transmit timing and the uplink receive timing of the RU. As described in more detail herein, the wireless forwarding node may then fine-tune or otherwise adjust the downlink transmit timing and/or the uplink receive timing of the RU to align the downlink transmit timing and/or the uplink receive timing at a sub-symbol-level, a sample-level, and/or the like.

For example, with respect to the downlink transmit timing for forwarding downlink signals to the downstream wireless node, the wireless forwarding node may adjust the downlink transmit timing of the RU based on one or more timing adjustment commands received from a control node (e.g., a donor node, such as the upstream wireless node). In some aspects, the timing adjustment commands received from the control node may indicate a time delta value (e.g., T_delta) to adjust the downlink transmit timing of the RU of the wireless forwarding node, where the time delta value may indicate information that the RU of the wireless forwarding node can use to calculate a round-trip time to the upstream wireless node. For example, the time delta value may indicate a misalignment that the upstream wireless node can tolerate between the uplink receive timing of the upstream wireless node and the symbol boundary aligned with the downlink transmit timing of the upstream wireless node. Accordingly, the wireless forwarding node may determine the round-trip time between the wireless forwarding node and the upstream wireless node based on the time delta value in combination with the timing advance command used to set the uplink transmit timing towards the upstream wireless node.

Furthermore, with respect to the uplink receive timing for receiving uplink signals from the downstream wireless node (to be forwarded to the upstream wireless node), the wireless forwarding node may be configured to autonomously adjust the uplink receive timing within a window with respect to another timing reference (e.g., the downlink transmit timing). For example, in some aspects, a size of the window may be a fixed value (e.g., a number of symbols, slots, and/or the like), or the size of the window may be configured by an operations, administration, and management (OAM) entity that controls operations of the wireless forwarding node, or indicated (e.g., dynamically or semi-statically) by the control node. For example, as described above, the upstream wireless node may tolerate a threshold misalignment between the downlink transmit timing and the uplink receive timing of the upstream wireless node, which may determine the window within which the wireless forwarding node can autonomously determine the uplink receive timing for receiving uplink signals from the downstream wireless node (e.g., the uplink receive timing may be adjusted within the window to ensure that an uplink signal is received by the wireless forwarding node at a time that allows the uplink signal to be digitally processed, forwarded to, and received by the upstream wireless node within a threshold time of the symbol boundary aligned with the downlink transmit timing of the upstream wireless node). In this way, the wireless forwarding node may shift an FFT window that determines when the wireless forwarding node collects and starts to process samples of the uplink signal. Accordingly, the wireless forwarding node may determine the window within which the uplink receive timing can be autonomously adjusted with respect to another timing reference (e.g., within 500 nanoseconds of the downlink transmit timing), and may autonomously adjust the uplink receive timing accordingly.

As indicated above, FIG. 8 is provided as an example. Other examples may differ from what is described with regard to FIG. 8.

Figure 9:
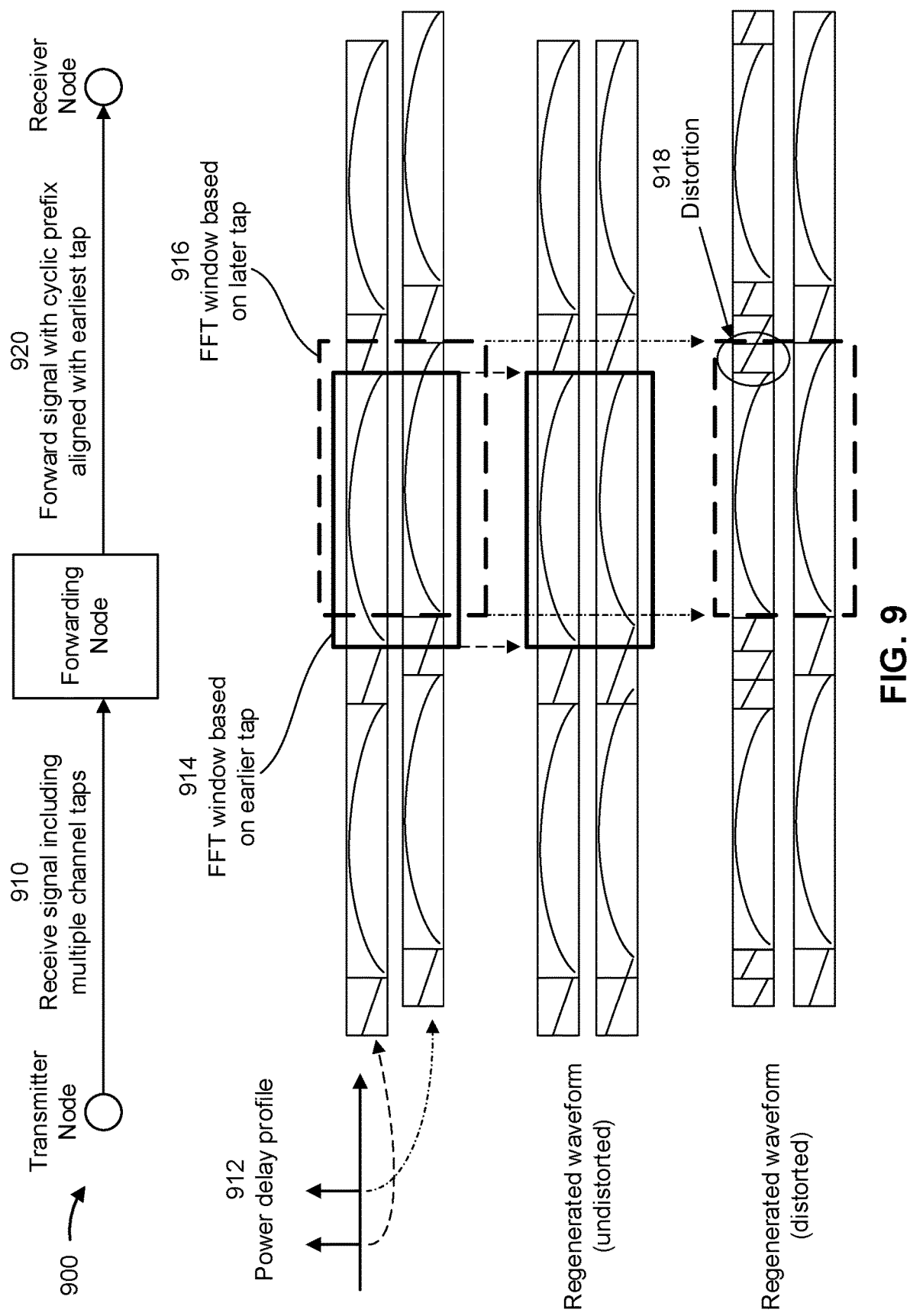

FIG. 9 is a diagram illustrating an example 900 associated with timing adjustment for wireless remote units, in accordance with the present disclosure. As shown in FIG. 9, example 900 includes a forwarding node that may receive an incoming signal from a transmitter node, perform one or more repeater operations or relay operations to process the incoming signal, and forward the signal to a receiver node. As described herein, example 900 relates to one or more techniques that the forwarding node may use to adjust an FFT window timing associated with the incoming signal received from the transmitter node. For example, in some aspects, the incoming signal may be an uplink signal in cases where the transmitter node is a downstream wireless node, a downlink signal in cases where the transmitter node is an upstream wireless node, or a sidelink signal in cases where the transmitter node and the receiver node are UEs communicating over a sidelink.

As shown in FIG. 9, and by reference number 910, the forwarding node may receive, from the transmitter node, an incoming signal to be forwarded. As shown by reference number 912, the incoming signal may be associated with a power delay profile that includes multiple channel taps received at different times. For example, in some aspects, the incoming signal may propagate from the transmitter node to the forwarding node through different paths with different propagation delays based on one or more clusters (e.g., reflectors) in a wireless channel between the transmitter node and the forwarding node. Accordingly, the multiple channel taps may correspond to different copies of the incoming signal, which are generally identical but shifted in time with respect to one another. For example, a first copy of the incoming signal may include a series of symbols (e.g., the curved or parabolic lines) that each begin with a cyclic prefix (e.g., the slanted lines), and a second copy of the incoming signal may generally be identical to the first copy that is delayed in time. In general, at a receive port of the forwarding node, the incoming signal may be received as a superposition transmission (e.g., a sum of the different copies of the incoming signal). In general, the forwarding node may need to determine an FFT window within which to collect samples of the incoming signal to be processed and forwarded to the receiver node.

Accordingly, in some aspects, the forwarding node may adjust the timing of the FFT window (e.g., the receive timing) for the incoming signal to minimize distortion and capture maximum channel power in a regenerated waveform that is forwarded towards the receiver node. For example, reference number 914 illustrates an FFT window that is aligned with the timing of the first (earlier) channel tap, and reference number 916 illustrates an FFT window that is aligned with the timing of the second (delayed) channel tap. In particular, the forwarding node may generally capture samples of the incoming signal within the FFT window, which starts after the cyclic prefix. Accordingly, if the FFT window is aligned with the timing of the first (earlier) channel tap, as shown by reference number 914, the samples that are captured by the forwarding node may include the series of symbols associated with the first copy of the incoming signal and part of the second copy of the incoming signal (e.g., part of a cyclically shifted or delayed version of the first copy). As a result, the regenerated waveform may be undistorted, and may have a clean, cyclic pattern that can be received and decoded by the receiver node. However, if the FFT window were to be aligned with the timing of the second (later) channel tap, as shown by reference number 916, the samples that the forwarding node captures from the first copy of the incoming signal may include the later portion of the symbol that overlaps with the FFT window aligned with the second (later) channel tap and the beginning portion (e.g., the cyclic prefix) of the next symbol. As a result, the regenerated waveform may be distorted, as shown by reference number 918 (e.g., the summation of the two signals includes parts of different symbols, which may result in reception and/or decoding problems at the receiver node).

Accordingly, as shown by reference number 920, the forwarding node may regenerate the incoming signal (e.g., when the forwarding node is implemented as a repeater unit) and/or may generate a new signal that includes information from and/or about the incoming signal (e.g., when the forwarding node is implemented as a relay unit) with a cyclic prefix that is aligned with an earliest significant channel tap (e.g., an earliest channel tap that satisfies a threshold). In other words, at a sub-symbol-level, the forwarding node may determine an FFT window timing that is aligned with (e.g., starts after) the cyclic prefix of the earliest significant channel tap in order to capture the maximum channel power, reduce distortion in the forwarded signal, and/or the like. Furthermore, as described herein, the forwarding node may employ various techniques to fine-tune or otherwise adjust the downlink receive timing and/or uplink receive timing of the forwarding node to determine the FFT window timing such that the cyclic prefix of the forwarded signal is aligned with the earliest significant channel tap.

For example, in some aspects, the forwarding node may be configured to adjust a downlink receive timing in cases where the forwarding node includes an RU that is implemented as a repeater unit that does not fully decode a downlink signal. Otherwise, when the repeater unit is configured to fully decode downlink signals (e.g., implementing split option 6) or the RU is implemented as a relay unit that always fully decodes downlink signals, any misalignment in time between different channel taps may be resolved through the decoding process (e.g., through channel estimation, channel equalization, and/or the like). In such cases, any distortion in the incoming signal would not be propagated to the next hop. However, when the RU is a repeater unit that does not fully decode an incoming downlink signal to be forwarded to the receiver node, the downlink receive timing (e.g., the FFT window timing for processing samples of an incoming downlink signal) may need to be adjusted to align the cyclic prefix with the earliest significant channel tap to avoid adding impairments to the forwarded signal.

Accordingly, in some aspects, the downlink receive timing of the forwarding node may be tracked and/or adjusted by an MT of the forwarding node (e.g., in a similar manner as described above with reference to FIG. 8). For example, the MT may receive downlink reference signal transmissions from the transmitter node, and may track the downlink receive timing based at least in part on the downlink reference signal transmissions. Additionally, or alternatively, the forwarding node may be instructed (e.g., periodically by the transmitter node and/or a control node) to forward the received downlink signal back to the transmitter node such that the transmitter node can estimate a timing offset and send a timing adjustment command for the downlink receive timing to the RU of the forwarding node. For example, the RU may be configured with a fixed FFT window that is used to process, regenerate, and forward the downlink signal back to the transmitter node. The transmitter node can then analyze the downlink signal that was forwarded back by the forwarding node, and may determine the appropriate adjustment to the downlink receive timing based on the presence and/or timing of any distortion in the forwarded signal.

In this way, by forwarding the downlink signal back to the transmitter node and enabling the transmitter node to transmit a timing adjustment command to adjust the downlink receive timing, the downlink receive timing may be adjusted to align the cyclic prefix of forwarded downlink signals with the earliest significant channel tap in cases where the MT of the forwarding node is out-of-band. For example, the MT of the forwarding node may be out-of-band in cases where the MT only exchanges control messages with the control node and the control communication is in a different frequency band or frequency range (e.g., sub-6 GHz) than a frequency band or frequency range used for communicating downlink signals (e.g., FR2). In such cases, the MT may be unable to keep track of the downlink receive timing for the RU (e.g., because timing may differ across the different frequencies), whereby the periodic forwarding of downlink signals back to the transmitter node may enable the downlink receive timing of the RU to be appropriately tuned or adjusted. Additionally, or alternatively, the transmitter node may instruct the forwarding node to forward a downlink signal back to the transmitter node in cases where the transmitter node uses a wideband signal to enable more accurate time estimation. For example, even when the MT communication is in-band (e.g., in the same band as downlink communication), the MT communication may be limited to a narrow bandwidth part because the MT communication may only include exchange of control messages. Accordingly, the transmitter node may send a wideband downlink signal to the forwarding node and instruct the forwarding node to forward the wideband downlink signal back to the transmitter node to estimate the timing offset more accurately than the MT.

In some aspects, when the transmitter node is a UE such that the incoming signal is an uplink signal, the uplink receive timing may be adjusted to account for a power delay profile including multiple channel taps, regardless of whether the RU is implemented as a repeater unit or a relay unit. For example, relay units and repeater units may be configured to forward uplink signals without fully decoding the incoming uplink signal (unless the relay or repeater unit implements split option 6). Accordingly, the forwarding node may implement techniques to adjust the uplink receive timing (e.g., the FFT window timing for capturing samples) to ensure that the cyclic prefix of a forwarded uplink signal is aligned with the earliest significant channel tap.

For example, in some aspects, the RU of the forwarding node may have a fixed uplink receive timing, and a control node (e.g., a DU of the receiver node and/or a separate control node) may estimate a timing offset based on the forwarded uplink signal. In this case, the control node may transmit a new uplink transmit timing advance command to the transmitter node (e.g., the UE) and/or a new uplink receive timing adjustment command to the RU of the forwarding node based on the timing offset. Additionally, or alternatively, the RU of the forwarding node may have a capability to track an uplink receive timing by processing one or more uplink reference signal transmissions (e.g., sounding reference signal (SRS) transmissions, uplink DMRS transmissions, and/or the like). In this case, the RU may autonomously adjust the uplink receive timing within a limited window (e.g., in a similar manner as described above with reference to FIG. 8). Additionally, or alternatively, the RU of the forwarding node may indicate the estimated timing offset to the DU (e.g., in DCI and/or a MAC-CE), and the control node may use the estimated timing offset to adjust the uplink transit timing of the transmitter node (e.g., the UE) and/or the uplink receive timing of the RU of the forwarding node.

As indicated above, FIG. 9 is provided as an example. Other examples may differ from what is described with regard to FIG. 9.

Figure 10:
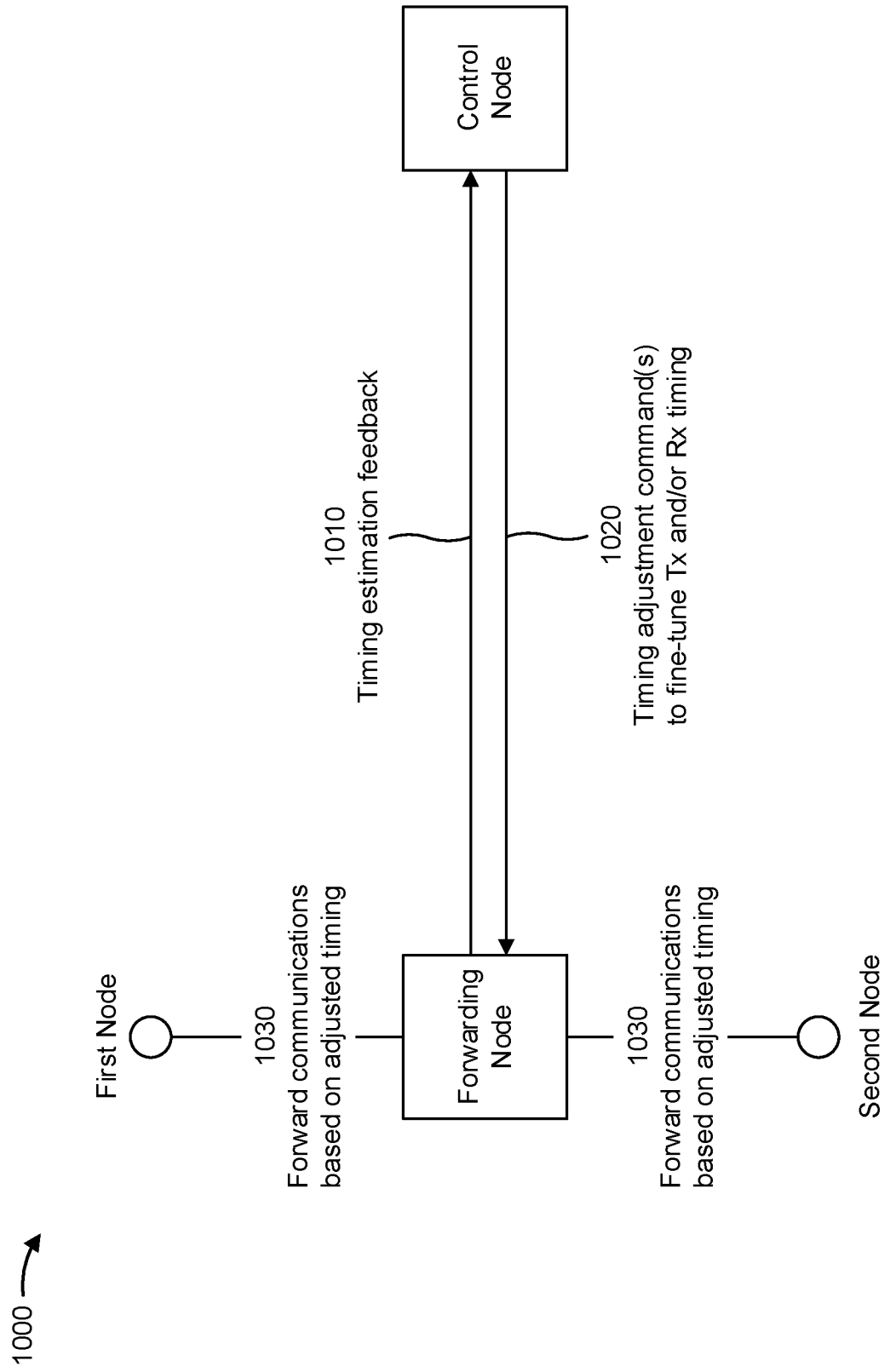

FIG. 10 is a diagram illustrating an example 1000 associated with timing adjustment for wireless remote units, in accordance with the present disclosure. As shown in FIG. 10, example 1000 includes a forwarding node that may forward communications between a first wireless node and a second wireless node. In addition, as shown, example 1000 includes a control node that may control forwarding operations of the forwarding node. In some aspects, the control node may be the same as either the first wireless node or the second wireless node (e.g., a network node using the forwarding node to extend coverage), or the control node may be different from the first wireless node and the second wireless node. In some aspects, the first wireless node may correspond to a network node (e.g., a base station DU) and the second wireless node may correspond to a UE, or vice versa, or the first wireless node and the second wireless node may correspond to respective UEs communicating on a sidelink.

As shown in FIG. 10, and by reference number 1010, the control node may receive timing estimation feedback associated with one or more timing reference configurations that the forwarding node uses to forward communications between the first wireless node and the second wireless node. For example, in some aspects, the one or more timing reference configurations may include a first receive timing for receiving incoming signals from the first wireless node to be forwarded to the second wireless node, a second receive timing for receiving incoming signals from the second wireless node to be forwarded to the first wireless node, a first transmit timing for forwarding signals received from the second wireless node towards the first wireless node, and/or a second transmit timing for forwarding signals received from the first wireless node towards the second wireless node. In some aspects, as shown, the control node may receive the timing estimation feedback from the forwarding node. Additionally, or alternatively, the control node may receive timing estimation feedback from the first wireless node and/or the second wireless node that are communicating through the forwarding node on an uplink, a downlink, or a sidelink, among other examples.

In some aspects, the forwarding node may establish symbol-level receive timings and symbol-level transmit timings for communicating with the first wireless node and/or the second wireless node using one or more techniques described in further detail above with respect to FIGS. 8-9. Accordingly, the timing estimation feedback that is received by the control node may include one or more estimated timing offsets determined by the forwarding node, the first wireless node, and/or the second wireless node, which the control node may use to determine one or more adjustments (e.g., sub-symbol adjustments) to one or more of the symbol-level receive timings and/or symbol-level transmit timings that the forwarding node uses to communicate with the first wireless node and/or the second wireless node. Additionally, or alternatively, the timing estimation feedback may include information associated with one or more transmissions (e.g., information associated with a received downlink signal forwarded back to a transmitter node) that the control node can use to estimate timing offsets for adjusting one or more of the symbol-level receive timings, and/or symbol-level transmit timings that the forwarding node uses to communicate with the first wireless node and/or the second wireless node.

As further shown in FIG. 10, and by reference number 1020, the control node may transmit, to the forwarding node, one or more timing adjustment commands to fine-tune or otherwise adjust one or more of the symbol-level receive timings and/or symbol-level transmit timings that the forwarding node uses to communicate with the first wireless node and/or the second wireless node. For example, the timing adjustment commands may indicate an FFT window timing for adjusting a downlink and/or uplink receive timing to align a cyclic prefix of a forwarded signal with an earliest significant channel tap (e.g., where an incoming signal to be forwarded is associated with a power delay profile including multiple channel taps received at different times). Additionally, or alternatively, the timing adjustment commands may be used to adjust, at a sub-symbol level, a transmit timing that the forwarding node uses to forward a signal towards the first wireless node and/or the second wireless node. Accordingly, as further shown in FIG. 10, and by reference number 1030, the forwarding node may forward communications between the first wireless node and the second wireless node based on the timing adjustment(s) indicated in the timing adjustment command(s) received from the control node.

As indicated above, FIG. 10 is provided as an example. Other examples may differ from what is described with regard to FIG. 10.

Figure 11:
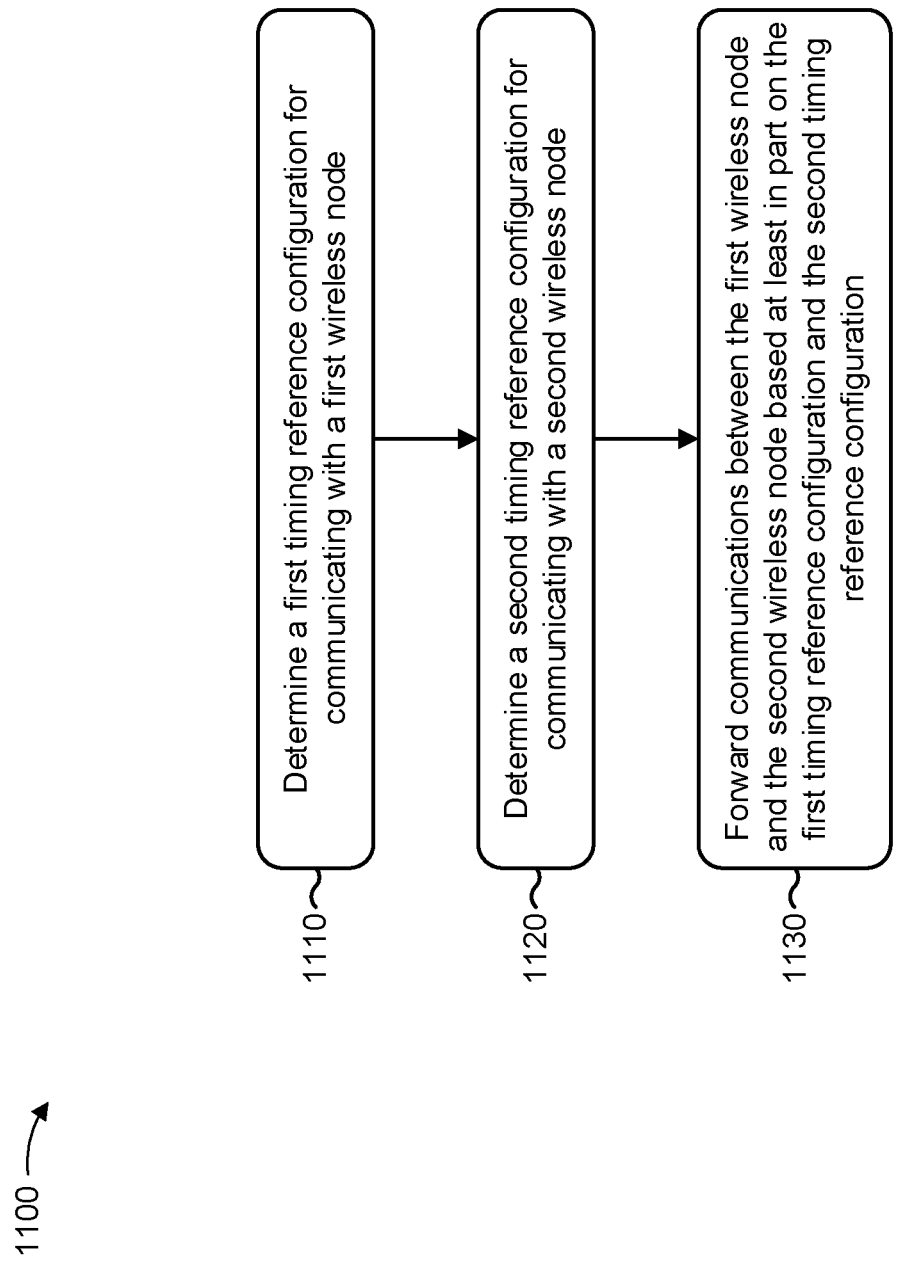
FIGS. 11-13 are diagrams illustrating example processes associated with timing adjustment for wireless remote units, in accordance with the present disclosure.

FIG. 11 is a diagram illustrating an example process 1100 performed, for example, by a wireless forwarding node, in accordance with the present disclosure. Example process 1100 is an example where the wireless forwarding node (e.g., forwarding node 310, forwarding node 405, and/or the like) performs operations associated with timing adjustment for wireless remote units.

As shown in FIG. 11, in some aspects, process 1100 may include determining a first timing reference configuration for communicating with a first wireless node (block 1110). For example, the wireless forwarding node (e.g., using determination component 1408, depicted in FIG. 14) may determine a first timing reference configuration for communicating with a first wireless node, as described above.

As further shown in FIG. 11, in some aspects, process 1100 may include determining a second timing reference configuration for communicating with a second wireless node (block 1120). For example, the wireless forwarding node (e.g., using determination component 1408, depicted in FIG. 14) may determine a second timing reference configuration for communicating with a second wireless node, as described above.

As further shown in FIG. 11, in some aspects, process 1100 may include forwarding communications between the first wireless node and the second wireless node based at least in part on the first timing reference configuration and the second timing reference configuration (block 1130). For example, the wireless forwarding node (e.g., using reception component 1402 and/or transmission component 1404, depicted in FIG. 14) may forward communications between the first wireless node and the second wireless node based at least in part on the first timing reference configuration and the second timing reference configuration, as described above.

Process 1100 may include additional aspects, such as any single aspect or any combination of aspects described below and/or in connection with one or more other processes described elsewhere herein.

In a first aspect, determining the first timing reference configuration includes determining a receive timing for receiving one or more signals from the first wireless node based at least in part on one or more reference signal transmissions received from the first wireless node, and determining a transmit timing for forwarding one or more signals to the first wireless node based at least in part on one or more timing advance commands received from a control node or the first wireless node.

In a second aspect, alone or in combination with the first aspect, determining the receive timing includes receiving a signal from the first wireless node, forwarding the signal back to the first wireless node, and receiving, from the first wireless node or a control node, a timing adjustment command for the receive timing that indicates an estimated timing offset based at least in part on the signal forwarded back to the first wireless node.

In a third aspect, alone or in combination with one or more of the first and second aspects, the second timing reference configuration includes a transmit timing for forwarding one or more signals from the first wireless node to the second wireless node and/or a receive timing for receiving one or more signals from the second wireless node to be forwarded to the first wireless node.

In a fourth aspect, alone or in combination with one or more of the first through third aspects, the transmit timing is based at least in part on a timing adjustment command received from a control node or the first wireless node and/or a round trip time between the wireless forwarding node and the first wireless node.

In a fifth aspect, alone or in combination with one or more of the first through fourth aspects, the receive timing has a fixed value and/or a value that is based at least in part on a timing adjustment command received from the first wireless node.

In a sixth aspect, alone or in combination with one or more of the first through fifth aspects, the receive timing is autonomously determined within a window with respect to another timing reference.

In a seventh aspect, alone or in combination with one or more of the first through sixth aspects, a size of the window is fixed, preconfigured by an OAM entity, or dynamically indicated by a control node or the first wireless node.

In an eighth aspect, alone or in combination with one or more of the first through seventh aspects, the receive timing is determined based at least in part on one or more reference signal transmissions received from the second wireless node.

In a ninth aspect, alone or in combination with one or more of the first through eighth aspects, process 1100 includes transmitting, to a control node or the first wireless node, information indicating an estimated timing offset associated with the receive timing.

In a tenth aspect, alone or in combination with one or more of the first through ninth aspects, process 1100 includes receiving, from a control node or the first wireless node, information indicating an adjustment to the receive timing associated with the wireless forwarding node.

In an eleventh aspect, alone or in combination with one or more of the first through tenth aspects, forwarding the communications between the first wireless node and the second wireless node includes receiving, from the first wireless node, a signal to be forwarded to the second wireless node, wherein the signal is associated with a power delay profile including multiple channel taps received at different times, and forwarding the signal to the second wireless node using a cyclic prefix aligned with an earliest of the multiple channel taps that satisfies a threshold.

In a twelfth aspect, alone or in combination with one or more of the first through eleventh aspects, forwarding the communications between the first wireless node and the second wireless node includes receiving, from the second wireless node, a signal to be forwarded to the first wireless node, wherein the signal is associated with a power delay profile including multiple channel taps received at different times, and forwarding the signal to the first wireless node using a cyclic prefix aligned with an earliest of the multiple channel taps that satisfies a threshold.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
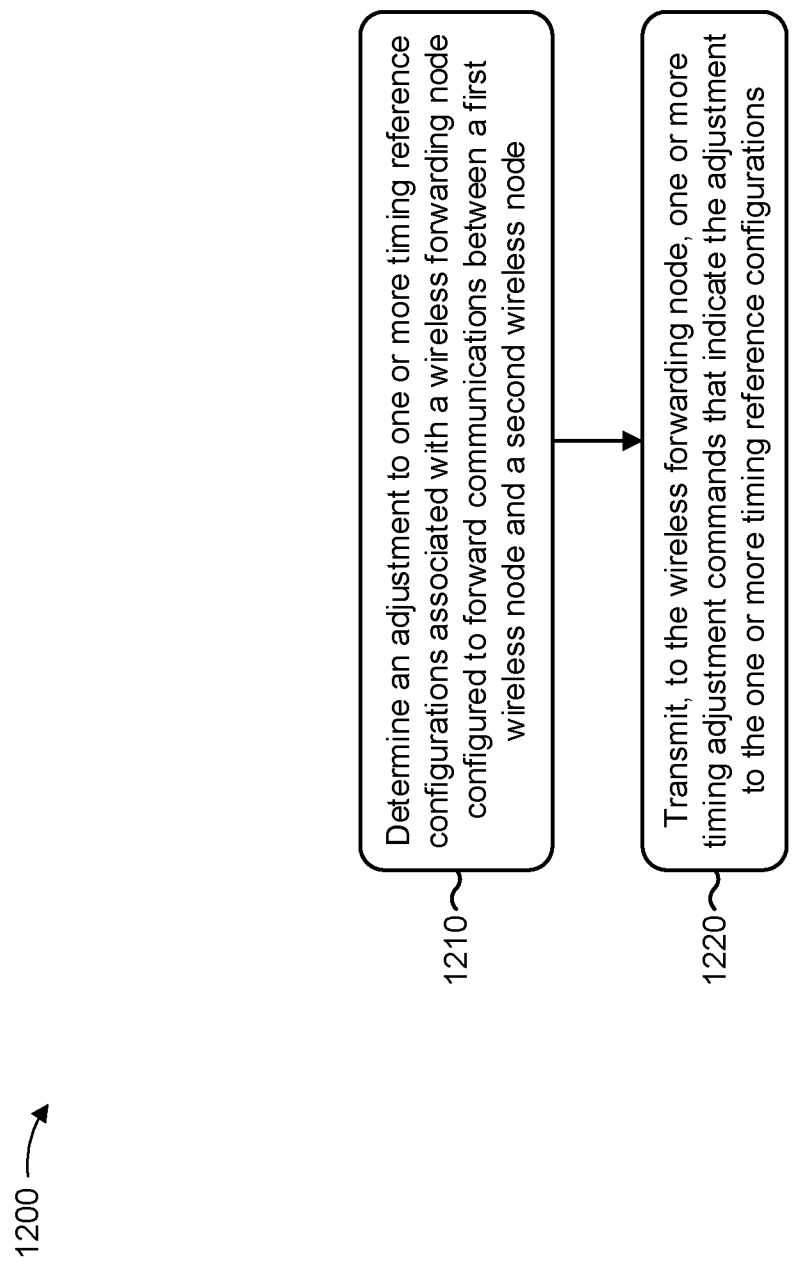

FIG. 12 is a diagram illustrating an example process 1200 performed, for example, by a control node, in accordance with the present disclosure. Example process 1200 is an example where the control node (e.g., control node 410 and/or the like) performs operations associated with timing adjustment for wireless remote units.

As shown in FIG. 12, in some aspects, process 1200 may include determining an adjustment to one or more timing reference configurations associated with a wireless forwarding node configured to forward communications between a first wireless node and a second wireless node (block 1210). For example, the control node (e.g., using determination component 1508, depicted in FIG. 15) may determine an adjustment to one or more timing reference configurations associated with a wireless forwarding node configured to forward communications between a first wireless node and a second wireless node, as described above.

As further shown in FIG. 12, in some aspects, process 1200 may include transmitting, to the wireless forwarding node, one or more timing adjustment commands that indicate the adjustment to the one or more timing reference configurations (block 1220). For example, the control node (e.g., using transmission component 1504, depicted in FIG. 15) may transmit, to the wireless forwarding node, one or more timing adjustment commands that indicate the adjustment to the one or more timing reference configurations, as described above.

Process 1200 may include additional aspects, such as any single aspect or any combination of aspects described below and/or in connection with one or more other processes described elsewhere herein.

In a first aspect, the one or more timing adjustment commands indicate that the adjustment is to be applied to one or more of a first receive timing associated with the wireless forwarding node receiving one or more signals from the first wireless node to be forwarded to the second wireless node, a first transmit timing associated with the wireless forwarding node forwarding the one or more signals received from the first wireless node to the second wireless node, a second receive timing associated with the wireless forwarding node receiving one or more signals from the second wireless node to be forwarded to the first wireless node, or a second transmit timing associated with the wireless forwarding node forwarding the one or more signals received from the second wireless node to the first wireless node.

In a second aspect, alone or in combination with the first aspect, the adjustment to the one or more timing reference configurations is based at least in part on timing estimation feedback received from one or more of the wireless forwarding node, the first wireless node, or the second wireless node.

In a third aspect, alone or in combination with one or more of the first and second aspects, process 1200 includes transmitting, to one or more of the first wireless node or the second wireless node, one or more timing adjustment commands that indicate an adjustment to one or more timing reference configurations associated with communicating with the wireless forwarding node.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
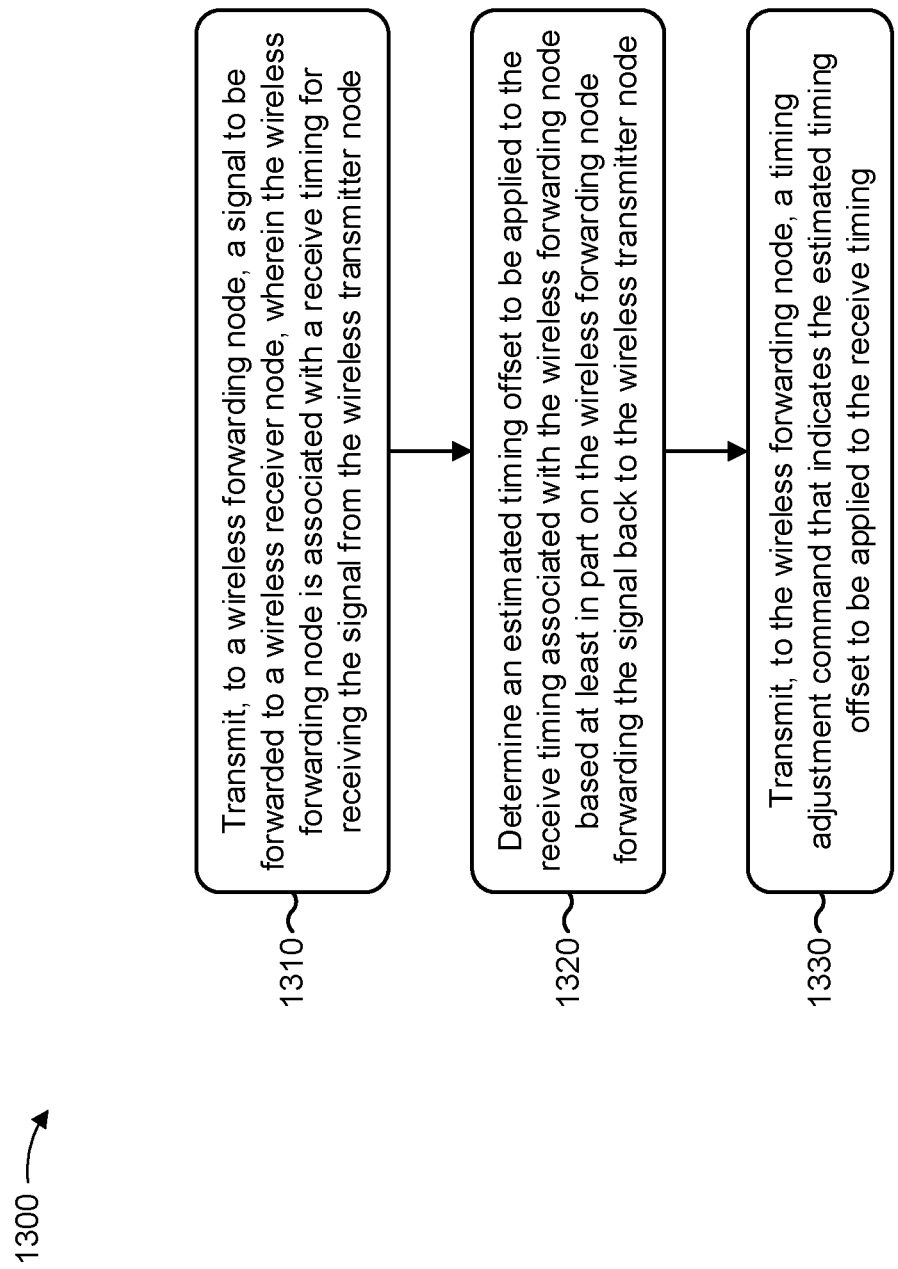

FIG. 13 is a diagram illustrating an example process 1300 performed, for example, by a transmitter node, in accordance with the present disclosure. Example process 1300 is an example where the transmitter node (e.g., base station 110, UE 120, first wireless node 305, wireless node 415 and/or 420, and/or the like) performs operations associated with timing adjustment for wireless remote units.

As shown in FIG. 13, in some aspects, process 1300 may include transmitting, to a wireless forwarding node, a signal to be forwarded to a wireless receiver node, wherein the wireless forwarding node is associated with a receive timing for receiving the signal from the transmitter node (block 1310). For example, the transmitter node (e.g., using transmission component 1604, depicted in FIG. 16) may transmit, to a wireless forwarding node, a signal to be forwarded to a wireless receiver node, wherein the wireless forwarding node is associated with a receive timing for receiving the signal from the transmitter node, as described above.

As further shown in FIG. 13, in some aspects, process 1300 may include determining an estimated timing offset to be applied to the receive timing associated with the wireless forwarding node based at least in part on the wireless forwarding node forwarding the signal back to the transmitter node (block 1320). For example, the transmitter node (e.g., using determination component 1608, depicted in FIG. 16) may determine an estimated timing offset to be applied to the receive timing associated with the wireless forwarding node based at least in part on the wireless forwarding node forwarding the signal back to the transmitter node, as described above.

As further shown in FIG. 13, in some aspects, process 1300 may include transmitting, to the wireless forwarding node, a timing adjustment command that indicates the estimated timing offset to be applied to the receive timing (block 1330). For example, the transmitter node (e.g., using transmission component 1604, depicted in FIG. 16) may transmit, to the wireless forwarding node, a timing adjustment command that indicates the estimated timing offset to be applied to the receive timing, as described above.

Process 1300 may include additional aspects, such as any single aspect or any combination of aspects described below and/or in connection with one or more other processes described elsewhere herein.

In a first aspect, process 1300 includes transmitting, to the wireless forwarding node, an instruction to forward the signal back to the transmitter node, and receiving the forwarded signal from the wireless forwarding node based at least in part on the instruction.

In a second aspect, alone or in combination with the first aspect, the signal is a wideband signal.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
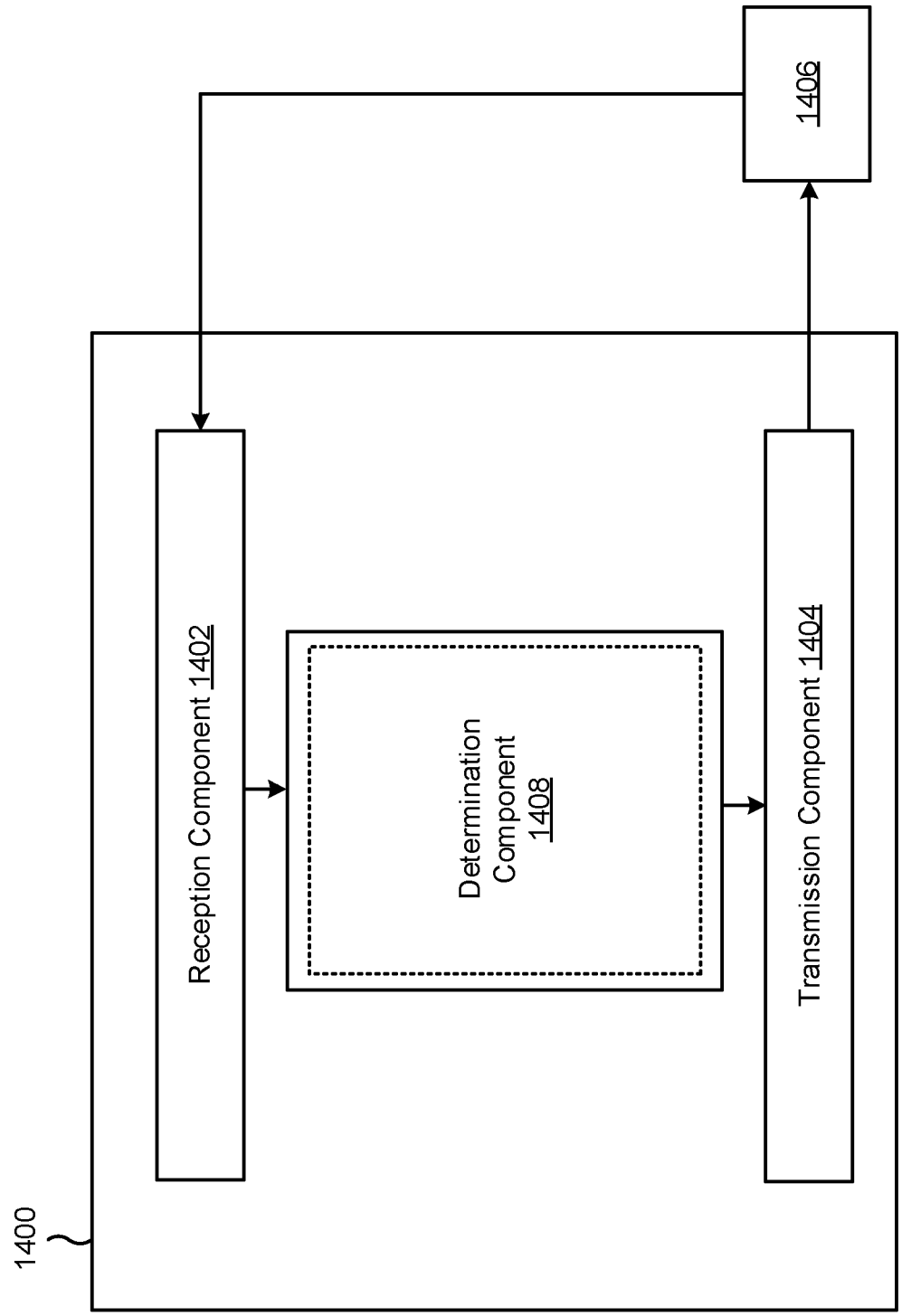
FIGS. 14-16 are block diagrams of example apparatuses for wireless communication, in accordance with the present disclosure.

FIG. 14 is a block diagram of an example apparatus 1400 for wireless communication. The apparatus 1400 may be a wireless forwarding node, such as a repeater node and/or a relay node, or a wireless forwarding node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, a control node, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 8-10. Additionally or alternatively, the apparatus 1400 may be configured to perform one or more processes described herein, such as process 1100 of FIG. 11. In some aspects, the apparatus 1400 and/or one or more components shown in FIG. 14 may include one or more components of the UE and/or the base station described above in connection with FIG. 2. Additionally, or alternatively, one or more components shown in FIG. 14 may be implemented within one or more components described above in connection with FIG. 2, FIG. 4, FIG. 5, FIG. 6A, and/or FIG. 6B. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, an Rx chain, or a combination thereof, of the UE, the base station, and/or the forwarding node described above in connection with FIG. 2, FIG. 3, FIG. 4, FIG. 5, FIG. 6A, and/or FIG. 6B.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, a Tx chain, or a combination thereof, of the UE, the base station, and/or the forwarding node described above in connection with FIG. 2, FIG. 3, FIG. 4, FIG. 5, FIG. 6A, and/or FIG. 6B. In some aspects, the transmission component 1404 may be co-located with the reception component 1402 in a transceiver.

The determination component 1408 may determine a first timing reference configuration for communicating with a first wireless node and may determine a second timing reference configuration for communicating with a second wireless node. In some aspects, the determination component 1408 may include one or more antennas, a demodulator, a MIMO detector, a receive processor, a modulator, a transmit MIMO processor, a transmit processor, a controller/processor, a memory, or a combination thereof, of the UE, the base station, and/or the forwarding node described above in connection with FIG. 2, FIG. 3, FIG. 4, FIG. 5, FIG. 6A, and/or FIG. 6B. The reception component 1402 and/or the transmission component 1404 may forward communications between the first wireless node and the second wireless node based at least in part on the first timing reference configuration and the second timing reference configuration.

The determination component 140 may determine a receive timing for receiving one or more signals from the first wireless node based at least in part on one or more reference signal transmissions received from the first wireless node, and may determine a transmit timing for forwarding one or more signals to the first wireless node based at least in part on one or more timing advance commands received from a control node or the first wireless node.

The reception component 1402 may receive a signal from the first wireless node. The transmission component 1404 may forward the signal back to the first wireless node. The reception component 1402 may receive, from the first wireless node or a control node, a timing adjustment command for the receive timing that indicates an estimated timing offset based at least in part on the signal forwarded back to the first wireless node.

The transmission component 1404 may transmit, to a control node or the first wireless node, information indicating an estimated timing offset associated with the receive timing.

The reception component 1402 may receive, from a control node or the first wireless node, information indicating an adjustment to the receive timing associated with the wireless forwarding node.

The reception component 1402 may receive, from the first wireless node, a signal to be forwarded to the second wireless node, wherein the signal is associated with a power delay profile including multiple channel taps received at different times. The transmission component 1404 may forward the signal to the second wireless node using a cyclic prefix aligned with an earliest of the multiple channel taps that satisfies a threshold.

The reception component 1402 may receive, from the second wireless node, a signal to be forwarded to the first wireless node, wherein the signal is associated with a power delay profile including multiple channel taps received at different times. The transmission component 1404 may forward the signal to the first wireless node using a cyclic prefix aligned with an earliest of the multiple channel taps that satisfies a threshold.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
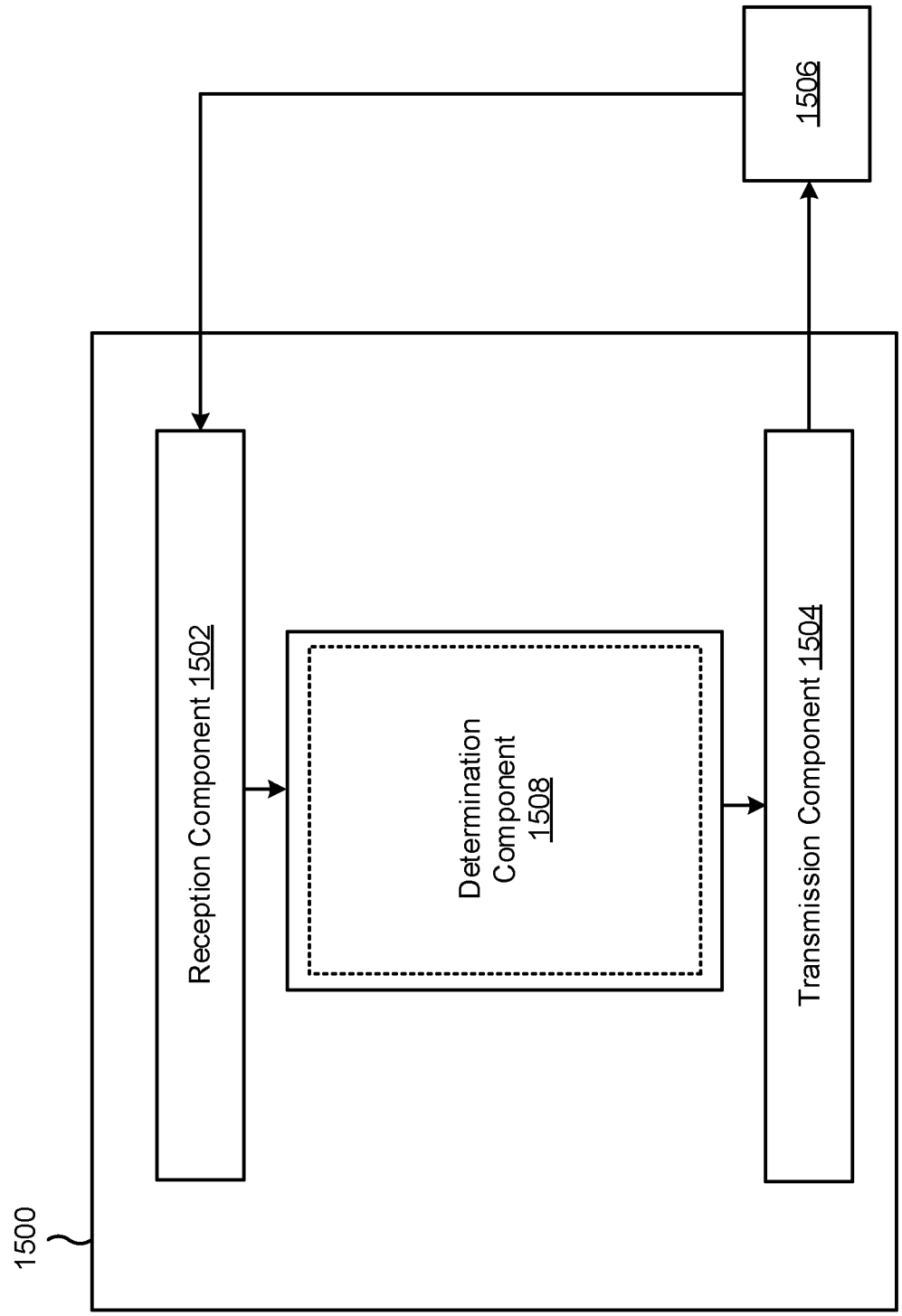

FIG. 15 is a block diagram of an example apparatus 1500 for wireless communication. The apparatus 1500 may be a control node, or a control node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, a wireless forwarding node, or another wireless communication device) using the reception component 1502 and the transmission component 1504. As further shown, the apparatus 1500 may include a determination component 1508, among other examples.

In some aspects, the apparatus 1500 may be configured to perform one or more operations described herein in connection with FIGS. 8-10. Additionally or alternatively, the apparatus 1500 may be configured to perform one or more processes described herein, such as process 1200 of FIG. 12 or a combination thereof. In some aspects, the apparatus 1500 and/or one or more components shown in FIG. 15 may include one or more components of the base station and/or network controller described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, a communication unit, or a combination thereof, of the base station, the network controller, and/or the control node described above in connection with FIG. 2 and/or FIG. 4.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, a communication unit, or a combination thereof, of the base station, the network controller, and/or the control node described above in connection with FIG. 2 and/or FIG. 4. In some aspects, the transmission component 1504 may be co-located with the reception component 1502 in a transceiver.

The determination component 1508 may determine an adjustment to one or more timing reference configurations associated with a wireless forwarding node configured to forward communications between a first wireless node and a second wireless node. In some aspects, the determination component 1508 may include one or more antennas, a demodulator, a MIMO detector, a receive processor, a controller/processor, a memory, a communication unit, or a combination thereof, of the base station, the network controller, and/or the control node described above in connection with FIG. 2 and/or FIG. 4. The transmission component 1504 may transmit, to the wireless forwarding node, one or more timing adjustment commands that indicate the adjustment to the one or more timing reference configurations.

The transmission component 1504 may transmit, to one or more of the first wireless node or the second wireless node, one or more timing adjustment commands that indicate an adjustment to one or more timing reference configurations associated with communicating with the wireless forwarding node.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
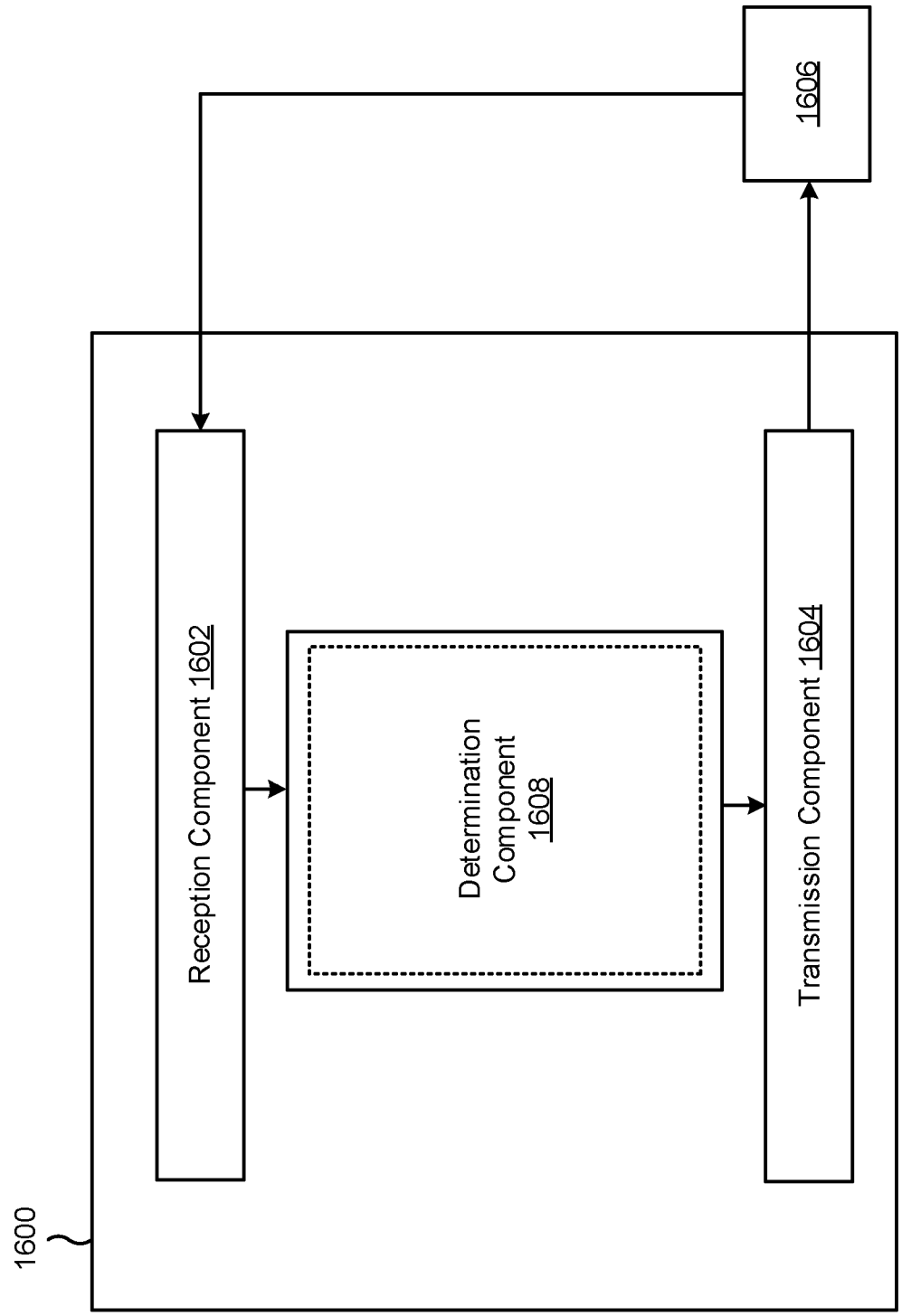

FIG. 16 is a block diagram of an example apparatus 1600 for wireless communication. The apparatus 1600 may be a transmitter node (e.g., a base station and/or a UE), or a transmitter node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, a wireless forwarding node, a control node, or another wireless communication device) using the reception component 1602 and the transmission component 1604. As further shown, the apparatus 1600 may include a determination component 1608, among other examples.

In some aspects, the apparatus 1600 may be configured to perform one or more operations described herein in connection with FIGS. 8-10. Additionally or alternatively, the apparatus 1600 may be configured to perform one or more processes described herein, such as process 1300 of FIG. 13 or a combination thereof. In some aspects, the apparatus 1600 and/or one or more components shown in FIG. 16 may include one or more components of the base station and/or the UE described above in connection with FIG. 2. Additionally, or alternatively, one or more components shown in FIG. 16 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the base station and/or the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the base station and/or the UE described above in connection with FIG. 2. In some aspects, the transmission component 1604 may be co-located with the reception component 1602 in a transceiver.

The transmission component 1604 may transmit, to a wireless forwarding node, a signal to be forwarded to a wireless receiver node, wherein the wireless forwarding node is associated with a receive timing for receiving the signal from the wireless transmitter node. The determination component 1608 may determine an estimated timing offset to be applied to the receive timing associated with the wireless forwarding node based at least in part on the wireless forwarding node forwarding the signal back to the wireless transmitter node. In some aspects, the determination component 1608 may include one or more antennas, a demodulator, a MIMO detector, a receive processor, a modulator, a transmit MIMO processor, a transmit processor, a controller/processor, a memory, or a combination thereof, of the base station and/or the UE described above in connection with FIG. 2. The transmission component 1604 may transmit, to the wireless forwarding node, a timing adjustment command that indicates the estimated timing offset to be applied to the receive timing.

The transmission component 1604 may transmit, to the wireless forwarding node, an instruction to forward the signal back to the wireless transmitter node. The reception component 1602 may receive the forwarded signal from the wireless forwarding node based at least in part on the instruction.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a wireless forwarding node, comprising: determining a first timing reference configuration for communicating with a first wireless node; determining a second timing reference configuration for communicating with a second wireless node; and forwarding communications between the first wireless node and the second wireless node based at least in part on the first timing reference configuration and the second timing reference configuration.

Aspect 2: The method of Aspect 1, wherein determining the first timing reference configuration includes: determining a receive timing for receiving one or more signals from the first wireless node based at least in part on one or more reference signal transmissions received from the first wireless node; and determining a transmit timing for forwarding one or more signals to the first wireless node based at least in part on one or more timing advance commands received from a control node or the first wireless node.

Aspect 3: The method of Aspect 2, wherein determining the receive timing includes: receiving a signal from the first wireless node; forwarding the signal back to the first wireless node; and receiving, from the first wireless node or a control node, a timing adjustment command for the receive timing that indicates an estimated timing offset based at least in part on the signal forwarded back to the first wireless node.

Aspect 4: The method of any of Aspects 1-3, wherein the second timing reference configuration includes one or more of a transmit timing for forwarding one or more signals from the first wireless node to the second wireless node, or a receive timing for receiving one or more signals from the second wireless node to be forwarded to the first wireless node.

Aspect 5: The method of Aspect 4, wherein the transmit timing is based at least in part on one or more of: a timing adjustment command received from a control node or the first wireless node, or a round trip time between the wireless forwarding node and the first wireless node.

Aspect 6: The method of any of Aspects 4-5, wherein the receive timing has a fixed value or a value that is based at least in part on a timing adjustment command received from the first wireless node.

Aspect 7: The method of any of Aspects 4-5, wherein the receive timing is autonomously determined within a window with respect to another timing reference.

Aspect 8: The method of Aspect 7, wherein a size of the window is fixed; preconfigured by an operations, administration, and maintenance entity; or dynamically indicated by a control node or the first wireless node.

Aspect 9: The method of any of Aspects 4-5, wherein the receive timing is determined based at least in part on one or more reference signal transmissions received from the second wireless node.

Aspect 10: The method of any of Aspects 4-9, further comprising: transmitting, to a control node or the first wireless node, information indicating an estimated timing offset associated with the receive timing.

Aspect 11: The method of any of Aspects 4-10, further comprising: receiving, from a control node or the first wireless node, information indicating an adjustment to the receive timing associated with the wireless forwarding node.

Aspect 12: The method of any of Aspects 1-11, wherein forwarding the communications between the first wireless node and the second wireless node includes: receiving, from the first wireless node, a signal to be forwarded to the second wireless node, wherein the signal is associated with a power delay profile including multiple channel taps received at different times; and forwarding the signal to the second wireless node using a cyclic prefix aligned with an earliest of the multiple channel taps that satisfies a threshold.

Aspect 13: The method of any of Aspects 1-12, wherein forwarding the communications between the first wireless node and the second wireless node includes: receiving, from the second wireless node, a signal to be forwarded to the first wireless node, wherein the signal is associated with a power delay profile including multiple channel taps received at different times; and forwarding the signal to the first wireless node using a cyclic prefix aligned with an earliest of the multiple channel taps that satisfies a threshold.

Aspect 14: A method of wireless communication performed by a control node, comprising: determining an adjustment to one or more timing reference configurations associated with a wireless forwarding node configured to forward communications between a first wireless node and a second wireless node; and transmitting, to the wireless forwarding node, one or more timing adjustment commands that indicate the adjustment to the one or more timing reference configurations.

Aspect 15: The method of Aspect 14, wherein the one or more timing adjustment commands indicate that the adjustment is to be applied to one or more of: a first receive timing associated with the wireless forwarding node receiving one or more signals from the first wireless node to be forwarded to the second wireless node, a first transmit timing associated with the wireless forwarding node forwarding the one or more signals received from the first wireless node to the second wireless node, a second receive timing associated with the wireless forwarding node receiving one or more signals from the second wireless node to be forwarded to the first wireless node, or a second transmit timing associated with the wireless forwarding node forwarding the one or more signals received from the second wireless node to the first wireless node.

Aspect 16: The method of any of Aspects 14-15, wherein the adjustment to the one or more timing reference configurations is based at least in part on timing estimation feedback received from one or more of the wireless forwarding node, the first wireless node, or the second wireless node.

Aspect 17: The method of any of Aspects 14-16, further comprising: transmitting, to one or more of the first wireless node or the second wireless node, one or more timing adjustment commands that indicate an adjustment to one or more timing reference configurations associated with communicating with the wireless forwarding node.

Aspect 18: A method of wireless communication performed by a transmitter node, comprising: transmitting, to a wireless forwarding node, a signal to be forwarded to a wireless receiver node, wherein the wireless forwarding node is associated with a receive timing for receiving the signal from the transmitter node; determining an estimated timing offset to be applied to the receive timing associated with the wireless forwarding node based at least in part on the wireless forwarding node forwarding the signal back to the transmitter node; and transmitting, to the wireless forwarding node, a timing adjustment command that indicates the estimated timing offset to be applied to the receive timing.

Aspect 19: The method of Aspect 18, further comprising: transmitting, to the wireless forwarding node, an instruction to forward the signal back to the transmitter node; and receiving the forwarded signal from the wireless forwarding node based at least in part on the instruction.

Aspect 20: The method of any of Aspects 18-19, wherein the signal is a wideband signal.

Aspect 21: An apparatus for wireless communication at a device, comprising a processor; memory coupled with the processor; and instructions stored in the memory and executable by the processor to cause the apparatus to perform the method of one or more of Aspects 1-13.

Aspect 22: A device for wireless communication, comprising a memory and one or more processors coupled to the memory, the one or more processors configured to perform the method of one or more of Aspects 1-13.

Aspect 23: An apparatus for wireless communication, comprising at least one means for performing the method of one or more of Aspects 1-13.

Aspect 24: A non-transitory computer-readable medium storing code for wireless communication, the code comprising instructions executable by a processor to perform the method of one or more of Aspects 1-13.

Aspect 25: A non-transitory computer-readable medium storing a set of instructions for wireless communication, the set of instructions comprising one or more instructions that, when executed by one or more processors of a device, cause the device to perform the method of one or more of Aspects 1-13.

Aspect 26: An apparatus for wireless communication at a device, comprising a processor; memory coupled with the processor; and instructions stored in the memory and executable by the processor to cause the apparatus to perform the method of one or more of Aspects 14-17.

Aspect 27: A device for wireless communication, comprising a memory and one or more processors coupled to the memory, the one or more processors configured to perform the method of one or more of Aspects 14-17.

Aspect 28: An apparatus for wireless communication, comprising at least one means for performing the method of one or more of Aspects 14-17.

Aspect 29: A non-transitory computer-readable medium storing code for wireless communication, the code comprising instructions executable by a processor to perform the method of one or more of Aspects 14-17.

Aspect 30: A non-transitory computer-readable medium storing a set of instructions for wireless communication, the set of instructions comprising one or more instructions that, when executed by one or more processors of a device, cause the device to perform the method of one or more of Aspects 14-17.

Aspect 31: An apparatus for wireless communication at a device, comprising a processor; memory coupled with the processor; and instructions stored in the memory and executable by the processor to cause the apparatus to perform the method of one or more of Aspects 18-20.

Aspect 32: A device for wireless communication, comprising a memory and one or more processors coupled to the memory, the one or more processors configured to perform the method of one or more of Aspects 18-20.

Aspect 33: An apparatus for wireless communication, comprising at least one means for performing the method of one or more of Aspects 18-20.

Aspect 34: A non-transitory computer-readable medium storing code for wireless communication, the code comprising instructions executable by a processor to perform the method of one or more of Aspects 18-20.

Aspect 35: A non-transitory computer-readable medium storing a set of instructions for wireless communication, the set of instructions comprising one or more instructions that, when executed by one or more processors of a device, cause the device to perform the method of one or more of Aspects 18-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless forwarding node, comprising:
   a memory; and
   one or more processors, coupled to the memory, configured to:
      determine a first timing reference configuration for communicating with a first wireless node;
      determine a second timing reference configuration for communicating with a second wireless node; and
      forward communications between the first wireless node and the second wireless node based at least in part on the first timing reference configuration and the second timing reference configuration, wherein forwarding communications between the first wireless node and the second wireless node comprises:

receiving, from the first wireless node or the second wireless node, a signal to be forwarded to the other of the first wireless node or the second wireless node, wherein the signal is associated with a power delay profile including multiple channel taps received at different times; and forwarding the signal to the first wireless node or the second wireless node using a cyclic prefix aligned with an earliest of the multiple channel taps that satisfies a threshold.

2. The wireless forwarding node of claim 1, wherein the one or more processors, to determine the first timing reference configuration, are further configured to:

determine a receive timing for receiving one or more signals from the first wireless node based at least in part on one or more reference signal transmissions received from the first wireless node; and determine a transmit timing for forwarding one or more signals to the first wireless node based at least in part on one or more timing advance commands received from a control node or the first wireless node.

3. The wireless forwarding node of claim 2, wherein the one or more processors, to determine the receive timing, are further configured to:

receive a signal from the first wireless node;

forward the signal back to the first wireless node; and receive, from the first wireless node or a control node, a timing adjustment command for the receive timing that indicates an estimated timing offset based at least in part on the signal forwarded back to the first wireless node.

4. The wireless forwarding node of claim 1, wherein the second timing reference configuration includes one or more of a transmit timing for forwarding one or more signals from the first wireless node to the second wireless node, or a receive timing for receiving one or more signals from the second wireless node to be forwarded to the first wireless node.

5. The wireless forwarding node of claim 4, wherein the transmit timing is based at least in part on one or more of: a timing adjustment command received from a control node or the first wireless node, or a round trip time between the wireless forwarding node and the first wireless node.

6. The wireless forwarding node of claim 4, wherein the receive timing has a fixed value or a value that is based at least in part on a timing adjustment command received from the first wireless node.

7. The wireless forwarding node of claim 4, wherein the receive timing is autonomously determined within a window with respect to another timing reference.

8. The wireless forwarding node of claim 7, wherein a size of the window is fixed; preconfigured by an operations, administration, and maintenance entity; or dynamically indicated by a control node or the first wireless node.

9. The wireless forwarding node of claim 4, wherein the receive timing is determined based at least in part on one or more reference signal transmissions received from the second wireless node.

10. The wireless forwarding node of claim 4, wherein the one or more processors are further configured to:

transmit, to a control node or the first wireless node, information indicating an estimated timing offset associated with the receive timing.

11. The wireless forwarding node of claim 4, wherein the one or more processors are further configured to:

receive, from a control node or the first wireless node, information indicating an adjustment to the receive timing associated with the wireless forwarding node.

12. A control node, comprising:

a memory; and one or more processors, coupled to the memory, configured to:

determine an adjustment to one or more timing reference configurations associated with a wireless forwarding node configured to forward communications between a first wireless node and a second wireless node; and transmit, to the wireless forwarding node, one or more timing adjustment commands that indicate the adjustment to the one or more timing reference configurations to adjust a downlink or an uplink receive timing to align a cyclic prefix of a forwarded signal with an earliest channel tap that satisfies a threshold.

13. The control node of claim 12, wherein the one or more timing adjustment commands indicate that the adjustment is to be applied to one or more of:

a first receive timing associated with the wireless forwarding node receiving one or more signals from the first wireless node to be forwarded to the second wireless node, a first transmit timing associated with the wireless forwarding node forwarding the one or more signals received from the first wireless node to the second wireless node, a second receive timing associated with the wireless forwarding node receiving one or more signals from the second wireless node to be forwarded to the first wireless node, or a second transmit timing associated with the wireless forwarding node forwarding the one or more signals received from the second wireless node to the first wireless node.

14. The control node of claim 12, wherein the adjustment to the one or more timing reference configurations is based at least in part on timing estimation feedback received from one or more of the wireless forwarding node, the first wireless node, or the second wireless node.

15. The control node of claim 12, wherein the one or more processors are further configured to:

transmit, to one or more of the first wireless node or the second wireless node, one or more timing adjustment commands that indicate an adjustment to one or more timing reference configurations associated with communicating with the wireless forwarding node.

16. A transmitter node, comprising:

a memory; and one or more processors, coupled to the memory, configured to:

transmit, to a wireless forwarding node, a signal to be forwarded to a wireless receiver node, wherein the wireless forwarding node is associated with a receive timing for receiving the signal from the transmitter node;

determine an estimated timing offset to be applied to the receive timing associated with the wireless forwarding node based at least in part on the wireless forwarding node forwarding the signal back to the transmitter node; and transmit, to the wireless forwarding node, a timing adjustment command that indicates the estimated timing offset to be applied to the receive timing to adjust the receive timing to align a cyclic prefix of the signal with an earliest channel tap that satisfies a threshold.

17. The transmitter node of claim 16, wherein the one or more processors are further configured to:
   transmit, to the wireless forwarding node, an instruction to forward the signal back to the transmitter node; and
   receive the forwarded signal from the wireless forwarding node based at least in part on the instruction.

18. The transmitter node of claim 16, wherein the signal is a wideband signal.

19. A method of wireless communication performed by a wireless forwarding node, comprising:
   determining a first timing reference configuration for communicating with a first wireless node;
   determining a second timing reference configuration for communicating with a second wireless node; and
   forwarding communications between the first wireless node and the second wireless node based at least in part on the first timing reference configuration and the second timing reference configuration, wherein forwarding communications between the first wireless node and the second wireless node comprises:
      receiving, from the first wireless node or the second wireless node, a signal to be forwarded to the other of the first wireless node or the second wireless node, wherein the signal is associated with a power delay profile including multiple channel taps received at different times; and
   forwarding the signal to the first wireless node or the second wireless node using a cyclic prefix aligned with an earliest of the multiple channel taps that satisfies a threshold.

20. The method of claim 19, wherein determining the first timing reference configuration includes:
   determining a receive timing for receiving one or more signals from the first wireless node based at least in part on one or more reference signal transmissions received from the first wireless node; and
   determining a transmit timing for forwarding one or more signals to the first wireless node based at least in part on one or more timing advance commands received from a control node or the first wireless node.

21. The method of claim 20, wherein determining the receive timing includes:
   receiving a signal from the first wireless node;
   forwarding the signal back to the first wireless node; and
   receiving, from the first wireless node or a control node, a timing adjustment command for the receive timing that indicates an estimated timing offset based at least in part on the signal forwarded back to the first wireless node.

22. The method of claim 19, wherein the second timing reference configuration includes one or more of a transmit timing for forwarding one or more signals from the first wireless node to the second wireless node, or a receive timing for receiving one or more signals from the second wireless node to be forwarded to the first wireless node.

23. The method of claim 22, wherein the transmit timing is based at least in part on one or more of: a timing adjustment command received from a control node or the first wireless node, or a round trip time between the wireless forwarding node and the first wireless node.

24. The method of claim 22, wherein the receive timing has a fixed value or a value that is based at least in part on a timing adjustment command received from the first wireless node.

25. The method of claim 22, wherein the receive timing is autonomously determined within a window with respect to another timing reference.

26. The method of claim 22, wherein the receive timing is determined based at least in part on one or more reference signal transmissions received from the second wireless node.

* * * * *